US012621803B2

(12) United States Patent
Liu et al.

(10) Patent No.: US 12,621,803 B2
(45) Date of Patent: May 5, 2026

(54) INFORMATION TRANSMISSION METHOD, RESOURCE SELECTION METHOD, AND COMMUNICATION DEVICE

(71) Applicant: VIVO MOBILE COMMUNICATION CO., LTD., Guangdong (CN)

(72) Inventors: Shixiao Liu, Guangdong (CN); Zichao Ji, Guangdong (CN); Siqi Liu, Guangdong (CN); Huan Wang, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 447 days.

(21) Appl. No.: 18/178,776

(22) Filed: Mar. 6, 2023

(65) Prior Publication Data

US 2023/0209508 A1 Jun. 29, 2023

Related U.S. Application Data

(63) Continuation of application No. PCT/CN2021/120660, filed on Sep. 26, 2021.

(30) Foreign Application Priority Data

Sep. 28, 2020 (CN) ........................ 202011045724.X

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01); *H04W 72/0453* (2013.01)

(58) Field of Classification Search
CPC ....... H04W 28/26; H04W 4/06; H04W 72/02; H04W 72/0446; H04W 72/0453;
(Continued)

(56) References Cited

U.S. PATENT DOCUMENTS

2006/0195576 A1* 8/2006 Rinne ................... H04W 72/23
709/226
2015/0156756 A1* 6/2015 Zhang ................... H04W 72/23
370/336
(Continued)

FOREIGN PATENT DOCUMENTS

CN 101156491 A 4/2008
CN 103828452 A 5/2014
(Continued)

OTHER PUBLICATIONS

"Remaining details of sidelink resource allocation mode 2"; Huawei et al.; 3GPP TSG RAN WG1 Meeting #101-e R1-2003495 E-meeting, May 25-Jun. 5, 2020 (Year: 2020).*
(Continued)

*Primary Examiner* — Benjamin H Elliott, IV
(74) *Attorney, Agent, or Firm* — Price Heneveld LLP

(57) ABSTRACT

The application discloses an information transmission method, a resource selection method, an apparatus, and an electronic device, belongs to the field of communication technology. The information transmission method is applied to a first communication device and includes: sending second information to at least one second communication device according to at least one of first information and a first rule; where the first information and/or the first rule is used by the first communication device to determine a resource for sending the second information, and the second information is used by the second communication device to perform resource selection, or resource exclusion, or
(Continued)

resource reservation, or resource scheduling. This application can improve reliability of sidelink transmission.

18 Claims, 3 Drawing Sheets

(51) Int. Cl.
    *H04W 72/0446*        (2023.01)
    *H04W 72/0453*        (2023.01)
(58) Field of Classification Search
    CPC .... H04W 72/20; H04W 76/23; H04L 5/0044;
                H04L 5/0048; H04L 5/0053; H04L
                5/0055; H04L 5/0058; H04L 5/0094
    See application file for complete search history.

(56)                    References Cited

U.S. PATENT DOCUMENTS

| | | | | |
|---|---|---|---|---|
| 2017/0308710 | A1* | 10/2017 | Du | H04L 25/03866 |
| 2020/0100215 | A1* | 3/2020 | Li | H04L 1/1819 |
| 2020/0205127 | A1* | 6/2020 | Tang | H04W 72/20 |
| 2020/0213975 | A1* | 7/2020 | Chae | H04W 4/46 |
| 2021/0075552 | A1* | 3/2021 | Huang | H04L 1/1854 |
| 2021/0194647 | A1* | 6/2021 | Zhao | H04W 76/11 |
| 2021/0226726 | A1* | 7/2021 | Zhao | H04L 41/0803 |
| 2021/0227523 | A1* | 7/2021 | Zhang | H04W 72/20 |
| 2021/0250132 | A1* | 8/2021 | Chen | H04L 69/324 |
| 2021/0250150 | A1* | 8/2021 | Wu | H04L 1/0023 |
| 2021/0250924 | A1* | 8/2021 | Ji | H04W 72/23 |
| 2021/0297994 | A1* | 9/2021 | Zhang | H04L 1/1819 |
| 2021/0377959 | A1* | 12/2021 | Liu | H04W 24/10 |
| 2021/0400639 | A1* | 12/2021 | Lee | H04W 24/10 |
| 2022/0116168 | A1* | 4/2022 | Lee | H04W 56/00 |
| 2022/0141866 | A1* | 5/2022 | Liu | H04L 5/0094 |
| | | | | 370/329 |
| 2022/0167313 | A1* | 5/2022 | Zhou | H04W 72/20 |
| 2022/0174646 | A1* | 6/2022 | Lee | H04L 1/1893 |
| 2022/0232575 | A1* | 7/2022 | Lee | H04W 72/56 |
| 2022/0248414 | A1* | 8/2022 | Deng | H04L 1/1812 |
| 2022/0272704 | A1* | 8/2022 | Shin | H04W 72/20 |
| 2022/0346118 | A1* | 10/2022 | Wu | H04L 1/1819 |
| 2023/0209508 | A1* | 6/2023 | Liu | H04L 5/0058 |
| | | | | 370/329 |

FOREIGN PATENT DOCUMENTS

| | | | |
|---|---|---|---|
| CN | 107113840 | A | 8/2017 |
| CN | 107113866 | A | 8/2017 |
| CN | 108631966 | A | 10/2018 |
| CN | 109995443 | A | 7/2019 |
| CN | 110120844 | A | 8/2019 |
| CN | 110637491 | A | 12/2019 |
| CN | 110890942 | A | 3/2020 |
| CN | 110944394 | A | 3/2020 |
| CN | 110958586 | A | 4/2020 |
| CN | 110972276 | A | 4/2020 |
| CN | 111108788 | A | 5/2020 |
| CN | 111132329 | A | 5/2020 |
| CN | 111246483 | A | 6/2020 |
| CN | 111278050 | A | 6/2020 |
| CN | 111278108 | A | 6/2020 |
| CN | 111294861 | A | 6/2020 |
| CN | 111406395 | A | 7/2020 |
| CN | 111436033 | A | 7/2020 |
| CN | 111436118 | A | 7/2020 |
| WO | 2020028662 | A1 | 2/2020 |
| WO | 2020056560 | A1 | 3/2020 |
| WO | 2020073791 | A1 | 4/2020 |
| WO | 2020091494 | A1 | 5/2020 |
| WO | 2020139051 | A1 | 7/2020 |
| WO | 2020164590 | A1 | 8/2020 |

OTHER PUBLICATIONS

"Discussion of sidelink resource allocation mode 2 enhancements"; Nokia et al.; 3GPP TSG RAN WG1#102-e R1-2005501 e-Meeting, Aug. 17-28, 2020 (Year: 2020).*

"Discussion on feasibility and benefits for mode 2 enhancement"; LG Electronics; 3GPP TSG RAN WG1 Meeting #102-e R1-2005749 e-Meeting, Aug. 17-28, 2020 (Year: 2020).*

"Discussion on feasibility and benefit of mode 2 enhancements"; Spreadtrum Communications; 3GPP TSG RAN WG1 #102-e R1-2006268 e-Meeting, Aug. 17-28, 2020 (Year: 2020).*

"Feasibility and benefits of mode 2 enhancements for inter-UE coordination"; Ericsson; 3GPP TSG-RAN WG1 Meeting #102-e R1-2006445 e-Meeting, Aug. 17-28, 2020 (Year: 2020).*

"Summary for AI 8.11.2.2 Feasibility and benefits for mode 2 enhancements"; LG Electronics; #3GPP TSG RAN WG1 #102-e R1-2007412 e-Meeting, Aug. 17-28, 2020 (Year: 2020).*

"Resource Allocation for Mode 2 NR V2X"; Fraunhofer HHI et al.; 3GPP TSG-RAN WG2 Meeting #106 R2-1907080 Reno, USA, May 13-17, 2019 (Year: 2019).*

NEC, Resource allocation mechanism for NR V2X, 3GPP TSG RAN WG1 Meeting #95, R1-1812651, Nov. 12-16, 2018, Spokane, USA.

Samsung, On Feasibility and Benefits for Mode2 Enhancements, 3GPP TSG RAN WG1 #102-e, R1-2006171, Aug. 17-28, 2020, e-Meeting.

VIVO, Discussion on mode 2 enhancements, 3GPP TSG RAN WG1 #102-e, R1-2005404, e-Meeting, Aug. 17-28, 2020.

Fujitsu, Considerations on inter-UE coordination for mode 2 enhancements, 3GPP TSG RAN WG1 #102-e, R1-2005546, e-Meeting, Aug. 17-28, 2020.

ZTE et al., Inter-UE coordination in mode-2, 3GPP TSG RAN WG1 #102-e, R1-2005961, e-Meeting, Aug. 17-28, 2020.

VIVO, "Discussion on resource allocation mechanism for NR V2X", 3GPP TSG RAN WG1 Meeting #95, R1-1812309, Spokane, USA, Nov. 12-16, 2018.

Fraunhofer HHI, Fraunhofer IIS, "Designs for NR V2X Mode 2 Resource Allocation", 3GPP TSG RAN WG1 Meeting #95, R1-1812399, Spokane, USA, Nov. 12-16, 2018.

Spreadtrum Communications, "Discussion on resource allocation for mode 2", 3GPP TSG RAN WG1 Meeting #95, R1-1813085, Spokane, USA, Nov. 12-16, 2018.

Intel Corporation, "Outcome of Offline Discussion #2 for NR-V2X AI—7.2.4.1.4 Resource Allocation Mechanism", 3GPP TSG RAN WG1 Ad Hoc Meeting #1901, R1-1901462, Taipei, Jan. 21-25, 2019.

Intel Corporation, "Feature Lead Summary for NR-V2X AI—7.2.4.1.4 Resource Allocation Mechanism", 3GPP TSG RAN WG1 Meeting #96, R1-1903623, Athens, Greece, Feb. 25-Mar. 1, 2019.

* cited by examiner

Send second information to at least one second communication device according to at least one of first information and a first rule; where the first information and/or the first rule is used by a first communication device to determine a resource for sending the second information, and the second information is used by the second communication device to perform resource selection, or resource exclusion, or resource reservation, or resource scheduling ⟋ 101

FIG. 3

Receive second information from a first communication device; where the second information is used by the second communication device to perform resource selection, or resource exclusion, or resource reservation, or resource scheduling ⟋ 201

FIG. 4

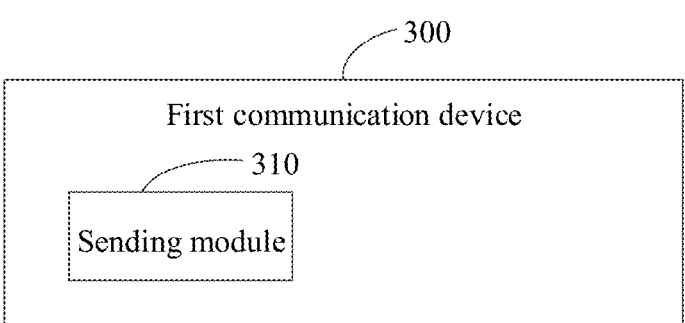

INFORMATION TRANSMISSION METHOD, RESOURCE SELECTION METHOD, AND COMMUNICATION DEVICE

CROSS-REFERENCE TO RELATED APPLICATIONS

This application is a continuation application of International Application No. PCT/CN2021/120660 filed on Sep. 26, 2021, which claims priority to Chinese Patent Application No. 202011045724.X, filed in China on Sep. 28, 2020, which are incorporated herein by reference in their entireties.

TECHNICAL FIELD

This application relates to the field of communication technologies, and in particular, to an information transmission method, a resource selection method, an apparatus, and an electronic device.

BACKGROUND

As restricted by an existing resource allocation method, reliability and power utilization of sidelink are relatively low. In order to improve transmission reliability and power utilization, a first communication device (such as a data receive end) may send some assistance information to a second communication device (such as a data transmit end or a control node) to ensure transmission reliability. However, in a groupcast scenario, if all first communication devices in a group send assistance information to the second communication device, huge signaling overheads are resulted, which in turn reduces reliability of data transmission. In addition, if a plurality of first communication devices send assistance information to the second communication device, how the second communication device selects resources based on such assistance information is also a selection problem, and this selection method needs to be clarified.

SUMMARY

According to a first aspect, an embodiment of this application provides an information transmission method, executed by a first communication device. The method includes:

sending second information to at least one second communication device according to at least one of first information or a first rule; where the first information and/or the first rule is used by the first communication device to determine a resource for sending the second information, and the second information is used by the second communication device to perform resource selection, or resource exclusion, or resource reservation, or resource scheduling.

According to a second aspect, an embodiment of this application provides a resource selection method, executed by a second communication device. The method includes:

receiving second information from a first communication device; where the second information is used by the second communication device to perform resource selection, or resource exclusion, or resource reservation, or resource scheduling.

According to a third aspect, an embodiment of this application provides an information transmission apparatus, executed by a first communication device and including:

a sending module, configured to send second information to at least one second communication device according to at least one of first information or a first rule; where the first information and/or the first rule is used by the first communication device to determine a resource for sending the second information, and the second information is used by the second communication device to perform resource selection, or resource exclusion, or resource reservation, or resource scheduling.

According to a fourth aspect, an embodiment of this application provides a resource selection apparatus, executed by a second communication device. The apparatus includes:

a receiving module, configured to receive second information from a first communication device; where the second information is used by the second communication device to perform resource selection, or resource exclusion, or resource reservation, or resource scheduling.

According to a fifth aspect, an embodiment of this application further provides an electronic device, including a processor, a memory, and a program or instructions stored in the memory and capable of running on the processor, and when the program or the instructions are executed by the processor, the steps of the method described above are implemented.

According to a sixth aspect, an embodiment of this application provides a readable storage medium, where a program or instructions are stored in the readable storage medium, and when the program or the instructions are executed by a processor, the steps of the method described above are implemented.

According to a seventh aspect, an embodiment of this application provides a chip, where the chip includes a processor and a communications interface, the communications interface is coupled to the processor, and the processor is configured to run a program or instructions to implement the method according to the first aspect and the second aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may derive other drawings from these accompanying drawings without creative efforts.

FIG. 3 is a schematic flowchart of an information transmission method according to an embodiment of this application;

FIG. 4 is a schematic flowchart of a resource selection method according to an embodiment of this application;

FIG. 5 is a schematic structural diagram of an information transmission apparatus according to an embodiment of this application;

DETAILED DESCRIPTION OF EMBODIMENTS

Figure 1:
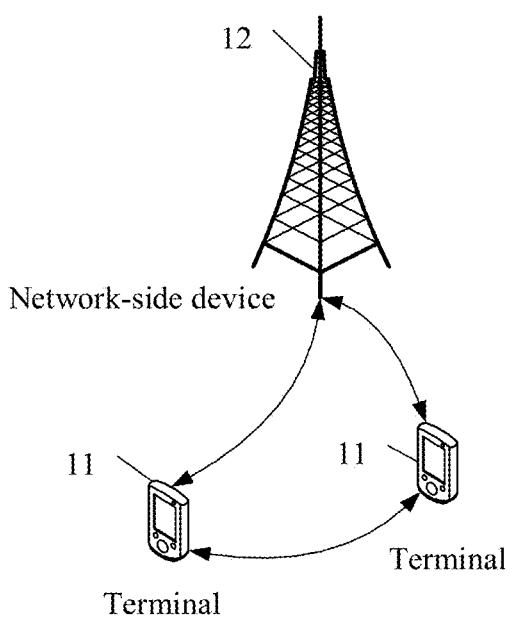
FIG. 1 is a schematic diagram of a wireless communications system.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a block diagram of a wireless communications system to which embodiments of this application are applicable. The wireless communications system includes a terminal 11 and a network-side device 12. The terminal 11 may also be referred to as a communication device or a user communication device (UE). The terminal 11 may be a communication device-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in the embodiments of this application. The network-side device 12 may be a base station or a core network. The base station may be a 5G base station and a base station of a later version (for example, a gNB or a 5G NR NB), or a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that in the embodiments of this application, the base station in the NR system is merely used as an example, and a specific type of the base station and a specific communications system are not limited.

New radio (NR) sidelink (SL) resources are allocated in two modes: base station scheduling mode (mode 1), and terminal (UE) autonomous resource selection mode (mode 2). In this case, resource information may be obtained from a broadcast message of the base station or pre-configured information. If the UE operates within coverage of the base station and has a radio resource control (RRC) connection to the base station, the UE can operate in mode 1 and/or mode 2; if the UE operates within coverage of the base station but has no RRC connection to the base station, the UE can operate only in mode 2; and if the UE is outside coverage of the base station, the UE can merely operate in mode 2 and performs V2X transmission based on pre-configured information. In mode 2, a specific operating manner is as follows:

(1) After resource selection is triggered for a data transmit end terminal (TXUE), the terminal first determines a resource selection window. A lower boundary of the resource selection window is at time T1 after triggering of resource selection, and an upper boundary of the resource selection window is at time T2 after the triggering.

T2 is a value selected by the UE from a data delay (PDB) for transmission of its transport block (TB), where T2 is not earlier than T1.

(2) Before resource selection, the UE needs to determine a candidate resource set for resource selection. A measured value of reference signal received power (RSRP) is compared with a corresponding RSRP threshold (the RSRP and the RSRP threshold are determined based on a result of monitoring (sensing), instead of being directly measured on resources in the resource selection window). If the RSRP is greater than the RSRP threshold, such resource is excluded and cannot be added to the candidate resource set. After resource exclusion is performed, remaining resources in the resource selection window form the candidate resource set.

The resources in the candidate resource set account for no less than 20% of the resources in the resource selection window. If less than x % (for example, x=20/40/60), the RSRP threshold needs to be increased based on a step value (3 dB), and then the resource exclusion operation is performed until no less than x % of the resources can be selected.

(3) After the candidate resource set is determined, the UE randomly selects transmission resources from the candidate resource set. In addition, the UE may reserve transmission resources for a next transmission during a current transmission.

NR V2X supports chained resource reservation, that is, one piece of sidelink control information (SCI) may be used for reserving a current resource and also for reserving a maximum of two additional resources, and two more reserved resources can be indicated on a next resource. Within the resource selection window, resources can be continuously reserved in a dynamic reservation manner.

In NR V2X, as restricted by the existing resource allocation modes, transmission reliability may be not high in some scenarios. For example, under the restriction of half duplex, some UEs cannot monitor reservation information of other UEs, resulting in low reliability; due to the problem of hidden nodes, reserved resources of two UEs located very close are the same, resulting in resource collision and relatively low reliability.

In order to improve reliability of sidelink transmission, the data receive end terminal (RX UE) may suggest some assistance information to the TX UE, so as to assist the TX UE in resource selection and/or adjusting transmission parameters of the TX UE. For example, the assistance information may include information about ideal reception resources for the RX UE, and the TX UE performs data transmission only on such resources, or preferentially selects such resources for data transmission to ensure transmission reliability; or the assistance information may include information about non-ideal reception resources of the RX UE, and the TX UE needs to exclude the resources during resource selection or resource reservation. In addition to the RX UE, a sender of the assistance information may alternatively be a control user, a pure auxiliary user, a control node, or the like.

Figure 2:
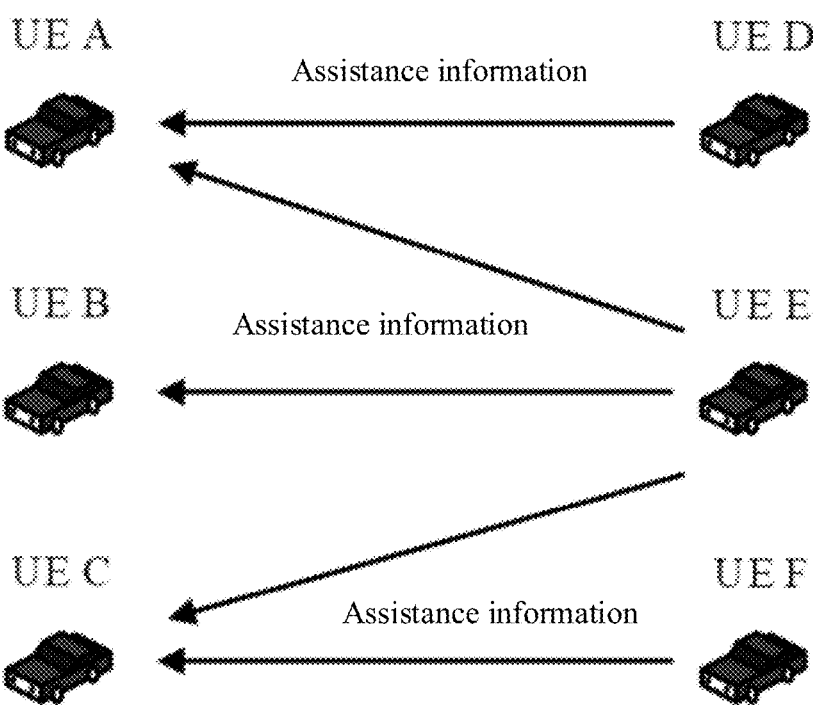
FIG. 2 is a schematic diagram of a plurality of UEs notifying a plurality of UEs of assistance information.

However, in a groupcast scenario, if all UEs in a group send assistance information to the TX UE, huge signaling overheads are resulted, which in turn reduces reliability of data transmission. In addition, if a plurality of UEs send assistance information to the TX UE, how the TX UE selects resources based on such assistance information is also a selection problem. Because a channel status of each RX UE is different, there is a relatively large difference in resources indicated in the assistance information by the RX UEs. As a result, reliability improvement cannot be implemented for data transmission on resources selected based on received assistance information. In a groupcast scenario, within a group, any data receive end can transmit assistance information to the data transmit end. As shown in FIG. 2, three UEs on the left side, namely UE A, UE B, and UE C, are data transmit ends, and they can receive assistance information from any data receive end (UE D, UE E, and UE F) or some data receive ends in the group, where assistance information received by UE A and UE C comes from a plurality of UEs.

An embodiment of this application provides an information transmission method, executed by a first communication device. As shown in FIG. 3, the method includes the following step.

Step 101: Send second information to at least one second communication device according to at least one of first information or a first rule.

The first information and/or the first rule is used by the first communication device to determine a resource for sending the second information, and the second information is used by the second communication device to perform resource selection, or resource exclusion, or resource reservation, or resource scheduling.

In this embodiment of this application, the first communication device sends the second information to the second communication device according to the first information and/or the first rule, and after receiving the second information from the first communication device, the second communication device may use the second information for resource selection, or resource exclusion, or resource reservation, or resource scheduling, so that the second communication device can make resource selection properly, ensuring high reliability of sidelink transmission.

In this embodiment, the first communication device may be UE2, the second communication device may be UE1, and the second information may be assistance information.

In some embodiments, the first information includes at least one of the following:

communication device identification information of a first-information transmit end, which is, for example, a UE ID of target receive UE of the first information; where the information may be carried when UE1 dynamically indicates UE that needs to send second information (which may be assistance information), and UE corresponding to a target UE ID sends the second information (which may be assistance information);

in-group identification information of the first-information receive end in a user group to which the first-information receive end belongs, which may be, for example, an M_ID (in-group UE ID); where the information may be carried when UE1 dynamically indicates UE that needs to send second information (which may be assistance information), and UE corresponding to target in-group ID (M_ID) information sends the second information (which may be assistance information);

group identification information of the user group to which the first-information receive end belongs, which may be, for example, a group ID, that is, a receive end of the first information is all UEs in a group corresponding to the group ID;

communication device identification information of a first-information transmit end;

sequence information for sending second information by at least one first communication device, which may be, for example, an order for sending the second information (which may be assistance information) by all or part of UEs in the group; where the information may be carried when UE1 semi-statically indicates UE that needs to send second information (which may be assistance information); for example, there are 5 UEs in a group that need to send the second information (which may be assistance information), and corresponding values of UE IDs or M_IDs of the UEs are 8, 4, 1, 7, and 6; there are 120 possibilities of sequence arrangements and combinations for the 5 UEs, which needs to be carried using 7 bits, with each codepoint corresponding to one UE ID sequence or M_ID sequence for all UEs; for another example, there are 5 UEs in the group, and corresponding values of UE IDs or M_IDs of the UEs are 8, 4, 1, 7, and 6; in this case, a sequence of the IDs is directly carried in the first information;

information included in a case that a third communication device is a starting point of feedback, where the third communication device is a specific first communication device, that is, when the specific first communication device is used as initial UE that sends second information (which may be assistance information), information such as some sending order rules and an interval for sending the second information (which may be assistance information) may be included; and such information may be carried when UE1 semi-statically indicates UE that needs to send second information (which may be assistance information);

time information for sending the second information by the first communication device;

information about the number of communication devices sending second information; or resource information used for transmitting the second information.

In some embodiments, the information included in a case that the third communication device is a starting point of feedback includes at least one of the following:

a communication device identifier of the third communication device, which is, for example, a UE ID or an M_ID of the starting UE; where one codepoint may represent an ID number, or may represent an actual ID value;

group identification information corresponding to a group to which the third communication device belongs, that is, group ID; or a sending order rule for the second information, which is, for example, a sending order rule of the second information (which may be assistance information), where each codepoint corresponds to one type of sending order rule of the second information (which may be assistance information), and the sending order rule may include at least: sending based on UE IDs or M_IDs of UEs that need to send the second information (which may be assistance information), or sending based on corresponding values calculated for UE IDs or M_IDs of UEs that need to send the second information (which may be assistance information), or sending based on a value A obtained through modulo 2 operation based on a benchmark, or sending in ascending order, or sending in descending order. In one case, a UE ID or an M_ID of the starting UE is carried, and then sending is performed in ascending order, in descending order, or at equal intervals; if the UE ID or M_ID of the starting UE is not a largest or smallest value, after UE corresponding to the largest or smallest value performs sending, a next one proceeds with sending from a peer end; in another case, no UE ID or M_ID of the starting UE is carried, and then the starting UE is by default UE with a largest or smallest UE ID or M_ID or with a UE ID or M_ID at a special position (such as a median position), or is UE corresponding to a largest, smallest, or special A value.

In some embodiments, the time information for sending the second information by the at least first communication device includes at least one of the following:

information about a time interval for sending second information by at least one first communication device, which is, for example, a time interval for sending the second information (which may be assistance information) by two different UEs; where the information may be carried when UE1 semi-statically indicates UE that needs to send second information (which may be assistance information);

information about a delay requirement for sending second information by at least one first communication device, which is, for example, a delay requirement for sending second information (which may be assistance information) by two different UEs; where the information may be carried when UE1 semi-statically indicates UE that needs to send second information (which may be assistance information);

information about a time interval between two consecutive transmissions of second information by a same first communication device, aiming to stagger times for feeding back the second information (which may be assistance information) by different UEs because one UE is not allowed to keeping transmitting the second information (which may be assistance information);

information about a time interval between any two transmissions of second information by a same first communication device;

information about a delay requirement for two consecutive transmissions of the second information by the same first communication device; or information about a delay requirement for any two transmissions of the second information by the same first communication device.

In some embodiments, the resource information used for transmitting the second information includes at least one of the following:

position information of a time-domain resource for sending second information by at least one first communication device, or delay information for sending the second information by the at least one first communication device; or position information of a frequency-domain resource for sending the second information by the at least one first communication device.

In some embodiments, the position information of the frequency-domain resource for sending the second information by the at least one first communication device includes at least one of the following:

granularity of a frequency-domain resource occupied by at least one piece of second information, where the unit may be a physical resource block (PRB), subband, resource element (RE), or bandwidth part (BWP);

sorting information of the frequency-domain resource occupied for sending the second information by the at least one first communication device, where, for example, there are 5 subbands on the full bandwidth, three users need to send the second information (which may be assistance information), and one piece of second information (which may be Assistance information) occupies one subband; in this case, there are 60 sequence possibilities of frequency-domain resources used by the three users, which needs to be indicated using 6 bits, for example, one codepoint 000000 may indicate that the frequency-domain resources used by the three users are 1, 2, and 3; or position information of the frequency-domain resource occupied for sending the second information by the at least one first communication device, where, for example, a codepoint 000 indicates that user 1 occupies subband 1, user 2 occupies subband 2, and user 3 occupies subband 3.

In some embodiments, the first information is carried by at least one of the following:

sidelink control information SCI;

PC5-radio resource control RRC message;

RRC message;

media access control control element (MAC CE);

downlink control information (DCI); or sidelink feedback control information (SFCI).

In some embodiments, a transmission resource of the first information uses at least one of the following:

physical sidelink shared channel PSSCH (PSSCH);

physical sidelink control channel (PSCCH);

physical sidelink feedback channel (PSFCH);

a resource in a dedicated resource pool;

a resource at a first position, which is, for example, a resource on the Pth symbol in a slot or resources on P symbols, where P is a positive integer; or is resources of Q subbands on one BWP or a resource on the Qth subband on one BWP, where Q is a positive integer; or is the Nth slot in a radio frame, where N is a positive integer; or a sidelink Sidelink channel or signal, for example, a synchronization signal block (SSB) signal.

In some embodiments, the first rule includes at least one of the following:

determining, based on a distance from the second communication device, a time-domain resource and/or a frequency-domain resource for sending the second information, where the distance may be an absolute physical distance or a relative physical distance;

determining, based on a measured RSRP value for the second communication device, a time-domain resource and/or a frequency-domain resource for sending the second information;

determining, based on a delay requirement for sending the second information by the first communication device, a time-domain resource for sending the second information;

determining, based on third information predefined in a protocol, a time-domain resource and/or a frequency-domain resource for sending the second information; or determining, according to a second rule, a time-domain resource and/or a frequency-domain resource for sending the second information.

In some embodiments, the determining, based on a distance from the second communication device, a time-domain resource and/or a frequency-domain resource for sending the second information includes:

determining, based on at least one of the distance from the second communication device, a first distance reference point, a first time reference point, or a first time step, the time-domain resource and/or a frequency-domain resource for sending the second information.

The first distance reference point, the first time reference point, and the first time step may be obtained from higher-layer signaling (MAC CE and/or RRC) configuration of the data transmit end or the control node, or pre-defined by a protocol, or pre-configured.

A unit of the first time step may be symbol, slot, subframe, or frame. A unit of the first distance reference point may be m, cm, km, or the like. The first time reference point may be a time point at which the data receive end receives data sent by the data transmit end and a decoding error occurs, or may be a time point at which the first information is received, or may be a time point at which a calculated decoding error rate within a time period is greater than a threshold, or may be a time point at which the number of times of receiving data with RV version within a time period exceeds a threshold, or may be a time point at which the number of times of occurrence of DTX within a time period exceeds a threshold, or may be a time point shifted backward from the foregoing time point by Q1 time units, where Q1 is a positive integer. Assuming that a time step is 10 slots, a distance step is 20 m, the distance reference point is 100 meters, and the time reference point is a time point at which data sent by the data transmit end is received and a decoding error occurs, denoted as a time point T. Then, within 1-10 slots after the time point T, UE located within a distance of 100 m to 120 m between the data transmit end and the data receive end and satisfying transmission of the assistance information transmits the assistance information. Within 11-20 slots after the time point T, UE located within a distance of 120 m to 140 m between the data transmit end and the data receive end and satisfying transmission of the assistance information transmits the assistance information. Within 21-30 slots after the time point T, UE located within a distance of 140 m to 160 m between the data transmit end and the data receive end transmits the assistance information. Assuming that the distance from the data receive end to the data transmit end is 150 m, the assistance information is transmitted within 21-30 slots after the time point T. In the foregoing embodiments, that the UE with a distance being greater than the distance reference point transmits the assistance information is used as an example. UE with a distance being less than the distance reference point can also transmit the assistance information, that is, within 1-10 slots after the time point T, UE located within a distance of 80 m to 100 m between the data transmit end and the data receive end and satisfying transmission of the assistance information transmits the assistance information; within 11-20 slots after the time point T, UE located within a distance of 60 m to 80 m between the data transmit end and the data receive end and satisfying transmission of the assistance information transmits the assistance information; and within 21-30 slots after the time point T, UE located within a distance of 40 m to 60 m between the data transmit end and the data receive end transmits the assistance information.

In some embodiments, the determining, based on a measured RSRP value for the second communication device, a time-domain resource for sending the second information includes:

determining, based on at least one of the measured RSRP value for the second communication device, a first power reference point, a first time reference point, or a first time step, the time-domain resource and/or a frequency-domain resource for sending the second information.

A unit of the first time step may be symbol, slot, subframe, or frame. A unit of the distance step may be m, cm, km, or the like. The first time reference point may be a time point at which the data receive end receives data sent by the data transmit end and a decoding error occurs, or may be a time point at which the first information is received, or may be a time point at which a calculated decoding error rate within a time period is greater than a threshold, or may be a time point at which the number of times of receiving data with RV version within a time period exceeds a threshold, or may be a time point at which the number of times of occurrence of DTX within a time period exceeds a threshold, or may be a time point shifted backward from the foregoing time point by Q2 time units, where Q2 is a positive integer. Assuming that a time step is 10 slots, an RSRP step is 3 dB, the RSRP reference point is −80 dBm, and the time reference point is a time point at which data sent by the data transmit end is received and a decoding error occurs, denoted as a time point T. Then, within 1-10 slots after the time point T, transmission of the assistance information starts when an RSRP value measured by the data receive end for the data sent by the data transmit end is between −83 dBm and −80 dBm; within 11-20 slots after the time point T, the data receive end UE starts to transmit the assistance information when an RSRP value measured by the data receive end for the data sent by the data transmit end is between −86 dBm and −83 dBm; and within 21-30 slots after the time point T, the data receive end UE starts to transmit the assistance information when an RSRP value measured by the data receive end for the data sent by the data transmit end is between −89 dBm and −86 dBm. Assuming that the RSRP of the data transmit end measured by the data receive end is −87 dBm, the assistance information is transmitted within 21-30 slots after the time point T. In the foregoing embodiments, that the UE with an RSRP being less than the RSRP measurement value reference point transmits the assistance information is used as an example. UE with an RSRP being greater than the RSRP measurement value reference point can also transmit the assistance information, that is, within 1-10 slots after the time point T, transmission of the assistance information starts when an RSRP value measured by the data receive end for the data sent by the data transmit end is between −80 dBm and −77 dBm; within 11-20 slots after the time point T, the data receive end UE starts to transmit the assistance information when an RSRP value measured by the data receive end for the data sent by the data transmit end is between −77 dBm and −74 dBm; within 21-30 slots after the time point T, the data receive end UE starts to transmit the assistance information when an RSRP value measured by the data receive end for the data sent by the data transmit end is between −74 dBm and −71 dBm.

For a time for sending second information (which may be assistance information) by UE that satisfies a condition, there may be a maximum delay requirement for sending the second information (which may be assistance information), and it is acceptable that sending is performed within the delay; or the UE that satisfies a condition immediately sends the second information (which may be assistance information).

In some embodiments, the third information includes at least one of the following:

a communication device identifier corresponding to a first communication device that initially transmits second information or identification information of a group to which the first communication device belongs, where a UE ID or an M_ID corresponding to the starting UE may be a special ID;

a time reference point for sending second information, where the time reference point may be a specific time point after reception of the first information, for example, sending is performed after Q3 slots, and Q3 is a positive integer; or the time reference point for sending the second information is one slot after reception of the first information;

a time interval for sending second information by at least two first communication devices;

a chronological order rule for sending second information by at least one first communication device, where, for example, the second information is sent in ascending order or descending order of corresponding values of UE IDs or M_IDs;

a frequency-domain resource occupied for sending second information by one first communication device, which may be a size or length of a frequency-domain resource or may be a starting position;

a spacing between frequency-domain resources for sending second information by at least two first communication devices, which may be may be N subbands or N PRBs; or a mapping rule or sorting rule in frequency domain for sending second information by at least one first communication device, where, for example, using PRB0 or subband 0 as a reference point, each UE applies a mapping order rule in ascending order or descending order to the frequency-domain resource based on its own UE ID or M_ID.

In some embodiments, the second rule includes at least one of the following:

performing mapping based on a communication device identifier of the first communication device or group identification information of a group to which the first communication device belongs, and determining a time-domain resource for sending the second information;

performing mapping based on the communication device identifier of the first communication device or the group identification information of the group to which the first communication device belongs, and determining a frequency-domain resource for sending the second information;

performing mapping based on a start or end position of a PSFCH feedback frequency-domain resource of the first communication device, and determining a frequency-domain resource for sending the second information;

performing mapping based on a start or end frequency-domain position of a PSCCH of the second communication device, and determining a frequency-domain resource for sending the second information;

performing mapping based on a start or end frequency-domain position of a PSSCH of the second communication device, and determining a frequency-domain resource for sending the second information;

performing mapping based on a distance between the first communication device and the second communication device, and determining a frequency-domain resource for sending the second information, where the distance may be an absolute geographical distance or a relative geographical distance; for example, a shorter distance indicates that the resource is closer to a starting point of the BWP;

performing mapping based on an RSRP value of the second communication device measured by the first communication device, and determining a frequency-domain resource for sending the second information, where, for example, a larger RSRP indicates that the resource is closer to a starting point of the BWP; or performing mapping based on an identifier of a zone in which the first communication device is located, and determining a frequency-domain resource for sending the second information, where a smaller zone ID indicates that the resource is closer to a starting point of the BWP, or mapping is performed based on a difference between a zone ID of the data transmit end and a zone ID of the data receive end or a modulo 2 operation result, for example, a smaller difference indicates that the resource is closer to a starting point of the BWP.

The second rule may be predefined by the protocol or configured by the higher layer, and may be indicated or configured by the control node or the TX UE.

In some embodiments, before the sending second information to at least one second communication device, the method further includes:

determining, by the first communication device based on at least one of the following information, whether to send the second information to the second communication device:

the number of data reception failures;

feedback information or response information;

a received redundancy version RV number;

geographical information of the first communication device and/or the second communication device;

an RSRP value of the second communication device measured by the first communication device;

a group to which the first communication device belongs, where the group is indicated by UE1 or a control node, or indicated by higher-layer signaling, or indicated by an application layer;

a device identifier of the first communication device;

a monitoring result of the first communication device; or a measurement result of the first communication device.

Optionally, the first communication device may alternatively not determine, based on the foregoing information, whether to send the second information to the second communication device, that is, determine, based on other information, whether to send the second information to the second communication device; or send the second information under any conditions; or send the second information provided that the data transmit end has data to send; or send the second information provided that the first information is received; or send the second information upon reception of trigger information for triggering transmission of the second information (which may be assistance information).

In some embodiments, the determining, based on the number of data reception failures, whether to send the second information to the second communication device includes at least one of the following:

for data transmitted by a same second communication device, sending the second information to the second communication device after any decoding failure;

for data carrying a same group identifier or a same destination identifier, sending the second information to the second communication device after any decoding failure;

for data transmitted by the same second communication device, sending the second information to the second communication device in a case that a cumulative number of reception failures within a target time period exceeds a first threshold, where, for example, for data transmitted from same UE1, when a cumulative number of reception failures (continuous or discontinuous) within a time period exceeds a threshold, UE2 sends second information (which may be assistance information) (used for assisting UE1 in selecting better resources to avoid transmission failures); further optionally, a length of the target time period may be notified by the transmit end UE (that is, UE1), notified using SCI, an RRC message, or a MAC CE, or configured by the control node, or predefined; and the time length may be a parameter associated with an SCS of a BWP and service QoS of the UE1, or may also be related to a PDB (packet delay budget); or for data carrying a same group identifier or a same destination identifier, sending the second information to the second communication device in a case that a cumulative number of reception failures within a target time period exceeds a second threshold, where, for example, for information carrying the same group ID or destination ID, when the number of reception failures of UE2 within a time period exceeds a threshold, the second information (which may be assistance information) is transmitted.

In some embodiments, the feedback information or response information includes at least one of the following:

the number of feedback timeouts or the number of response timeouts;

the number of feedback failures or the number of response failures;

the number of feedback cancellations or the number of response cancellations; or the number of feedback drops or the number of response drops.

The feedback or response includes at least one of a measurement feedback or response (for example, a feedback or response corresponding to RS is a measurement report), a feedback or response corresponding to a message or request (for example, a feedback or response for a CSI request is a CSI report), HARQ-ACK, or the like.

In some embodiments, the determining, based on the feedback information or response information, whether to send the second information to the second communication device includes at least one of the following:

in a case that the number of channel state information (CSI) feedback failures within a target time period exceeds a third threshold, sending the second information to the second communication device;

in a case that the number of channel state information feedback timeouts within a target time period exceeds a fourth threshold, sending the second information to the second communication device;

in a case that the number of feedback timeouts for a communication quality parameter measurement value within a target time period exceeds a fifth threshold, sending the second information to the second communication device;

in a case that the number of feedback failures for a communication quality parameter measurement value within a target time period exceeds a sixth threshold, sending the second information to the second communication device; or in a case that the number of feedback resource sending failures, feedback resource cancelations, or feedback resource drops within a target time period exceeds a seventh threshold, sending the second information to the second communication device.

A length of the target time period may be notified by the transmit end UE (that is, UE1), notified using SCI, an RRC message, or a MAC CE, or configured by the control node, or predefined. The time length may be a parameter associated with an SCS of a BWP and service QoS of the UE1, or may also be related to a PDB.

In some embodiments, the determining, based on the received RV number, whether to send the second information to the second communication device includes at least one of the following:

for a same transport block transmitted from the second communication device, sending the second information to the second communication device in a case that a received RV number of data is a first target value, where, for example, for transmission of one TB of UE1, if the received RV version is a specified value (such as RV0 or RV2), UE2 transmits the second information (which may be assistance information);

for data transmitted by a same second communication device, sending the second information to the second communication device in a case that the number of times of a cumulative number of received RV numbers within a target time period being the first target value exceeds an eighth threshold, where, for example, for data transmitted from UE1, when the number of times of a cumulative number of received RV versions within a time period being a specified value exceeds a threshold, UE2 sends second information (which may be assistance information); further optionally, a length of the target time period may be notified by the transmit end UE (that is, UE1), notified using SCI, an RRC message, or a MAC CE, or configured by the control node, or predefined; and the time length may be a parameter associated with an SCS of a BWP and service QoS of UE1, or may also be related to a PDB; or for data carrying a same group identifier or a same destination identifier, sending the second information to the second communication device in a case that the number of times of a cumulative number of received RV numbers within a target time period being the first target value exceeds a ninth threshold, where, for example, for information carrying the same group ID or destination ID, when the number of times of a cumulative number of received RV versions within a time period being a specified value exceeds a threshold, UE2 transmits the second information (which may be assistance information).

In some embodiments, the determining, based on the geographical information of the first communication device and/or the second communication device, whether to send the second information to the second communication device, or the determining, based on the RSRP value of the second communication device measured by the first communication device, whether to send the second information to the second communication device includes at least one of the following:

sending the second information to the second communication device in a case that a distance between the first communication device and the second communication device is determined to be greater than, less than, or equal to a tenth threshold, where, for example, when UE2 determines that a distance between UE1 and UE2 is greater than or less than a distance threshold, the data receive end sends the second information (which may be assistance information); in particular, the distance is less than, equal to, or greater than a communication range value carried in the control information;

sending the second information to the second communication device in a case that the RSRP value of the second communication device measured by the first communication device is greater than, less than, or equal to an eleventh threshold, where, for example, an RSRP measured by UE2 is greater than, equal to, or less than an RSRP threshold, and UE2 sends the second information (which may be assistance information);

sending the second information to the second communication device in a case that a zone in which the first communication device is located is the same as a zone in which the second communication device is located, or an zone identifier of the first communication device is the same as an zone identifier of the second communication device, where, for example, when a zone at which UE2 is located is the same as a zone at which UE1 is located, or when a zone ID of UE2 is the same as a zone ID of UE1, UE2 sends second information (which may be assistance information);

sending the second information to the second communication device in a case that a result obtained through calculation on the zone identifier of the first communication device and the zone identifier of the second communication device is less than or equal to, greater than or equal to, or equal to a twelfth threshold, where, for example, when a result obtained through operation on the zone ID of UE2 and the zone ID of UE1 is less than or equal to, or greater than or equal to a threshold, UE2 sends the second information (which may be assistance information), where the operation includes addition, subtraction, multiplication, and division, or modulo 2 operation;

sending the second information to the second communication device in a case that the number of areas in a dimension A between the zone in which the first communication device is located and the zone in which the second communication device is located is less than or equal to, greater than or equal to, or equal to a thirteenth threshold, where, for example, when there are N zones in the dimension A between the zone at which UE1 is located and the zone at which UE2 is located, UE2 sends the second information (which may be assistance information), where A may be longitude or latitude;

sending the second information to the second communication device in a case that the zone identifier of the second communication device is a first target value, where, for example, when the zone ID of UE2 is a specified value (for example, the zone ID is 1), UE2 sends the second information (which may be assistance information);

sending the second information to the second communication device in a case that the zone identifier of the first communication device is a second target value, where, for example, when the zone ID of UE1 is a specified value (for example, the zone ID is 2), UE2 sends the second information (which may be assistance information); or sending the second information to the second communication device in a case that control information sent by the second communication device and received by the first communication device carries the zone identifier of the second communication device, where, for example, when the control information received by UE2 carries the zone ID of UE1, UE2 sends the second information (which may be assistance information).

The thresholds involved in this embodiment may be all predefined by the protocol, or configured per resource pool by UE1, the control node, or another UE; further optionally, the values of the thresholds are related to service QoS parameters of UE1 or UE2 (such as PDB), or related to an SCS of the BWP.

In some embodiments, based on the number of times of occurrence of discontinuous receptions (DTX) or the number of times of detecting no acknowledgment (ACK) or negative acknowledgment (NACK) during transmission, it is determined whether to send the second information to the second communication device or whether the second communication device sends the second information to the first communication device. In this case, the data transmit end needs to collect statistics on the number of DTXs or the number of times of detecting no ACK or NACK, and then the data transmit end transmits the second information (which may be assistance information) to the data receive end, or the data transmit end sends, to the data receive end, the first information or other trigger information that triggers transmission of the second information, and the data receive end transmits the second information. This case includes at least one of the following:

if the number of times of occurrence of DTXs or the number of times of detecting no ACK or NACK for transmission of one TB exceeds the tenth threshold, the first communication device sends the second information to the second communication device or the second communication device sends the second information to the first communication device; or after the second communication device sends the first information to the first communication device, the first communication device sends the second information to the second communication device, for example, for transmission of one TB for UE1, the number of times of occurrence of DTXs or the number of times of detecting no ACK or NACK (half-duplex issue) exceeds a threshold, UE1 transmits the second information (assistance information), that is, UE1 transmits the second information (which may be assistance information) to UE2; or if the number of times of occurrence of DTXs or the number of times of detecting no ACK or NACK for data transmission of one second communication device within a target time period exceeds the eleventh threshold, the second information is sent to the second communication device, or the second communication device sends the second information to the first communication device; or after the second communication device sends the first information to the first communication device, the first communication device sends the second information to the second communication device, for example, for data transmitted by the transmit end UE, when the number of times of occurrence of DTXs or the number of times of detecting no ACK or NACK within a time period exceeds a threshold, transmission of the second information (which may be assistance information) is performed, that is, the data transmit end transmits the second information (which may be assistance information) to the data receive end, where a length of the target time period may be notified by the transmit end UE (that is, UE1), or notified using SCI, an RRC message, or a MAC CE, or configured by the control node, or may be predefined, and the time length may be a parameter associated with an SCS of a BWP and service QoS of the UE1, or may also be related to a PDB.

In some embodiments, the determining, based on the monitoring result of the first communication device, whether to send the second information to the second communication device includes:

sending the second information to the second communication device in a case that the monitoring result indicates that a resource reserved by the second communication device is at least partially the same as a resource reserved by the first communication device or another communication device, where the another communication device is a communication device other than the first communication device and the second communication device. For example, when UE2 performs sensing (control information monitoring), and finds that a resource reserved by UE1 or a resource reserved by another UE is all or partially the same as a resource reserved by UE2, the second information (which may be assistance information) is transmitted.

In some embodiments, the determining, based on the measurement result of the first communication device, whether to send the second information to the second communication device includes:

sending the second information to the second communication device in a case that a measured value for demodulation reference signal DMRS, channel state information reference signal CSI-RS, or synchronization signal block SSB for data transmission of at least one second communication device is less than or greater than a fourteenth threshold; and sending the second information to the second communication device in a case that the number of times of the measured value for demodulation reference signal DMRS, channel state information reference signal CSI-RS, or synchronization signal block SSB for data transmission of the at least one second communication device being less than or greater than a fifteenth threshold is greater than a sixteenth threshold.

For example, for one TB, when a measurement of DMRS, CSI-RS, or SSB by UE2 is less than or greater than a threshold, UE2 transmits the second information (which may be assistance information), where the measured value includes a received signal strength indicator (RSSI) measured value, an RSRP measured value, an energy measured value, a noise measured value, or an interference measured value, the RSRP measured value may be a layer 1 RSRP (L1-RSRP) measured value or a layer 3 RSRP (L3-RSRP) measured value.

In some embodiments, the method further includes: obtaining the first information or obtaining the first rule.

In some embodiments, a manner of obtaining the first information or obtaining the first rule includes at least one of the following:

obtaining from a notification of the second communication device;

obtaining from a notification of a control node; or obtaining from a notification of a communication device other than the second communication device.

In some embodiments, a time for sending the second information by the first communication device satisfies at least one of the following:

a time interval or delay for sending second information by at least two first communication devices is not less than a first time length, for example, a time interval or delay for sending second information (which may be assistance information) by two different data receive ends is not less than T1;

a time, a time interval, or a delay for sending the second information by the first communication device is not less than a second time length, for example, a time, a time interval, or a delay for sending second information (which may be assistance information) by one data receive end is not less than T2; or a time interval or delay for sending second information at least twice by a same first communication device is not less than a third time length, for example, a time or a delay for feeding back second information (which may be assistance information) twice by one data receive end is not less than T3.

In some embodiments, the sending second information to at least one second communication device further includes at least one of the following:

for reception of any data, ending transmission of the second information after correct decoding is implemented, where the any data may belongs to one TB or may belong to different TBs.

for reception of any data, ending transmission of the second information after correct decoding is implemented N times, where N is a positive integer;

for reception of any data, ending transmission of the second information in a case that a proportion of correct decoding is greater than a seventeenth threshold;

for data transmitted by at least one second communication device, ending transmission of the second information after correct decoding is implemented;

for data transmitted by at least one second communication device, ending transmission of the second information after correct decoding is implemented M times, where M is a positive integer;

for data transmitted by at least one second communication device, ending transmission of the second information in a case that a proportion of correct decoding is greater than an eighteenth threshold;

for data transmission with a data receive end being a same group identifier, ending transmission of the second information after correct decoding is implemented;

for data transmission with a data receive end being a same group identifier, ending transmission of the second information after correct decoding is implemented H times, where H is a positive integer; or for data transmission with a data receive end being a same group identifier, ending transmission of the second information in a case that a proportion of correct decoding is greater than a nineteenth threshold.

The criterion for an ending transmission behavior of the second information is also applicable to an ending transmission behavior of the first information.

In this embodiment, a length of the target time period is notified by the second communication device or a control node, or is configured by the second communication device or the control node, or is predefined by a protocol.

In this embodiment, a length of the target time period is associated with at least one of the following:

a subcarrier spacing of a bandwidth part; or a parameter associated with quality of service of a service of the second communication device, for example, service delay characteristic, reliability requirement, and priority.

An embodiment of this application provides a resource selection method, executed by a second communication device. As shown in FIG. 4, the method includes the following step.

Step 201: Receive second information from a first communication device.

The second information is used by the second communication device to perform resource selection, or resource exclusion, or resource reservation, or resource scheduling.

In some embodiments, that the second communication device performs resource selection, or resource exclusion, or resource reservation, or resource scheduling based on the second information includes at least one of the following:

selecting all resources of a first resource set for resource reservation, or resource exclusion, or resource scheduling, or resource selection; or randomly selecting N1 resources of the first resource set for resource reservation, or resource exclusion, or resource scheduling, or resource selection; where N1 is a positive integer.

In some embodiments, a manner of determining the first resource set includes at least one of the following:

determining based on a union of resources indicated by fourth information;

determining based on an intersection of the resources indicated by the fourth information;

determining based on most frequently occurring resources in the resources indicated by the fourth information;

determining based on top N2 most frequently occurring resources in the resources indicated by the fourth information, where N2 is a positive integer; or determining based on top N3% most frequently occurring resources in the resources indicated by the fourth information, where N3 is a positive integer.

In some embodiments, the fourth information includes at least one of the following: all second information received by the second communication device; or part of second information received by the second communication device.

In some embodiments, a manner of determining the part of second information includes at least one of the following:

determining based on a distance between the second communication device and the first communication device, for example, determining an assistance information set based on a distance between a transmit end and a receive end of the assistance information and a distance threshold, where, for example, a distance between a transmit end and a receive end of the second information (which may be assistance information) is less than or greater than the distance threshold, the second information is included in the set and is used by the second communication device to determine transmission resources and perform resource selection or reservation or scheduling or exclusion; optionally, the distance threshold may be predefined by a protocol, or notified or configured by a control node or control UE, or notified or configured by other UEs; or determining based on an RSRP value of the first communication device measured by the second communication device, for example, determining an assistance information set based on an RSRP value measured by a receive end of the assistance information and an RSRP threshold, where, for example, the RSRP value of the first communication device measured by the second communication device is less than or greater than the RSRP threshold, the second information is included in the set and is used by the second communication device to determine transmission resources and perform resource selection or reservation or scheduling or exclusion; optionally, the RSRP threshold may be predefined by the protocol, or notified or configured by the control node or control UE, or notified or configured by other UEs.

Optionally, the foregoing distance threshold and RSRP threshold may be predefined by the protocol, or notified or configured by the control node or the control UE, or notified or configured by other UEs.

In some embodiments, the method specifically includes:

determining, by the second communication device, a transmission resource based on a resource monitoring result and the second information, including at least one of the following:

determining, by the second communication device, a second candidate resource set based on a first candidate resource set and a resource indicated in the second information, where the first candidate resource set is determined based on its own resource monitoring (sensing) result;

determining, by the second communication device, a selected resource or a reserved resource based on a resource C and a resource D that is indicated by the second information, where the resource C is selected by the second communication device based on its own resource monitoring result.

In some embodiments, the determining, by the second communication device, a second candidate resource set based on a first candidate resource set and a resource indicated in the second information, where the first candidate resource set is determined based on its own resource monitoring result includes at least one of the following:

obtaining a union of the first candidate resource set and resources indicated by all received second information to obtain the second candidate resource set;

obtaining a union of the first candidate resource set and resources indicated by part of received second information to obtain the second candidate resource set;

obtaining an intersection of the first candidate resource set and resources indicated by all received second information to obtain the second candidate resource set;

obtaining an intersection of the first candidate resource set and resources indicated by part of received second information to obtain the second candidate resource set;

excluding, from the first candidate resource set, resources indicated by all received second information to obtain the second candidate resource set; or excluding, from the first candidate resource set, resources indicated by part of received second information to obtain the second candidate resource set.

In some embodiments, the determining, by the second communication device, a selected resource or a reserved resource based on a resource C and a resource D that is indicated by the second information, where the resource C is selected by the second communication device based on its own resource monitoring result, includes at least one of the following:

obtaining a union of the resource C and resources D indicated by all received second information to obtain a third candidate resource set, and optionally, randomly selecting X resources from the candidate resource set for resource reservation or resource scheduling;

obtaining a union of the resource C and resources D indicated by part of received second information to obtain a third candidate resource set, and optionally, randomly selecting X resources from the candidate resource set for resource reservation or resource scheduling;

obtaining an intersection of the resource C and resources D indicated by all received second information to obtain a third candidate resource set, and optionally, randomly selecting X resources from the candidate resource set for resource reservation or resource scheduling;

obtaining an intersection of the resource C and resources D indicated by part of received second information to obtain a third candidate resource set, and optionally, randomly selecting X resources from the candidate resource set for resource reservation or resource scheduling;

excluding, from the resource C, resources D indicated by all received second information to obtain a third candidate resource set, and optionally, randomly selecting X resources from the candidate resource set for resource reservation or resource scheduling;

excluding, from the resource C, resources D indicated by part of received second information to obtain a third candidate resource set, and optionally, randomly selecting X resources from the candidate resource set for resource reservation or resource scheduling;

obtaining a union of the resource C and resources D indicated by all received second information to obtain X resources for resource reservation or resource scheduling;

obtaining a union of the resource C and resources D indicated by part of received second information to obtain X resources for resource reservation or resource scheduling;

obtaining an intersection of the resource C and resources D indicated by all received second information to obtain X resources for resource reservation or resource scheduling;

obtaining an intersection of the resource C and resources D indicated by part of received second information to obtain X resources for resource reservation or resource scheduling;

excluding, from the resource C, resources D indicated by all received second information to obtain X resources for resource reservation or resource scheduling; or excluding, from the resource C, resources D indicated by part of received second information to obtain X resources for resource reservation or resource scheduling.

In some embodiments, the determining part of the second information includes at least one of the following:

determining the part of the second information based on the distance between the transmit end and the receive end of the second information and the distance threshold, for example, determining a second information (which may be assistance information) set based on the distance between the transmit end and the receive end of the second information (which may be assistance information) and the distance threshold; where, specifically, this may be second information corresponding to a distance ranking in the top M6% or the last N6%; or may be second information corresponding to a distance being less than the threshold or greater than the threshold; or determining the part of the second information based on a measured value of a communication quality parameter measured by the receive end of the second information and a quality value threshold, for example, determining a second information (which may be assistance information) set based on an RSRP value measured by the receive end of the second information (which may be assistance information) and an RSRP threshold; where, specifically, this may be second information (which may be assistance information) corresponding to an RSRP measured value ranking in the top M7% or the last N7%; or may be second information corresponding to an RSRP measured value being less than or greater than the threshold. In some embodiments, the obtaining an intersection of the resource C and resources D indicated by all received second information to obtain X resources for resource reservation or resource scheduling includes at least one of the following:

when X is an empty set, selecting C or D as a finally selected resource for resource reservation or resource scheduling, or selecting M8 resources from C or D as the finally selected resource for resource reservation or resource scheduling.

In some embodiments, the obtaining an intersection of the resource C and resources D indicated by part of received second information to obtain X resources for resource reservation or resource scheduling includes at least one of the following:

when X is an empty set, selecting C or D as a finally selected resource for resource reservation or resource scheduling, or selecting M9 resources from C or D as the finally selected resource for resource reservation or resource scheduling.

In some embodiments, the obtaining an intersection of the resource C and resources D indicated by all received second information to obtain a third candidate resource set, and optionally, randomly selecting X resources from the candidate resource set for resource reservation or resource scheduling includes at least one of the following:

when the third candidate resource set is an empty set, selecting C or D as the third candidate resource set.

In some embodiments, the obtaining an intersection of the resource C and resources D indicated by part of received second information to obtain a third candidate resource set, and optionally, randomly selecting X resources from the candidate resource set for resource reservation or resource scheduling includes at least one of the following:

when the third candidate resource set is an empty set, selecting C or D as the third candidate resource set.

In some embodiments, the method further includes at least one of the following: for reception of any data, ending transmission of the second information after correct decoding is implemented, where the any data may belongs to one TB or may belong to different TBs;

for reception of any data, ending transmission of the second information after correct decoding is implemented N times, where N is a positive integer;

for reception of any data, ending transmission of the second information in a case that a proportion of correct decoding is greater than a seventeenth threshold;

for data transmitted by at least one second communication device, ending transmission of the second information after correct decoding is implemented;

for data transmitted by at least one second communication device, ending transmission of the second information after correct decoding is implemented M times, where M is a positive integer;

for data transmitted by at least one second communication device, ending transmission of the second information in a case that a proportion of correct decoding is greater than an eighteenth threshold;

for data transmission with a data receive end being a same group identifier, ending transmission of the second information after correct decoding is implemented;

for data transmission with a data receive end being a same group identifier, ending transmission of the second information after correct decoding is implemented H times, where H is a positive integer; or for data transmission with a data receive end being a same group identifier, ending transmission of the second information in a case that a proportion of correct decoding is greater than a nineteenth threshold.

The criterion for an ending transmission behavior of the second information is also applicable to an ending transmission behavior of the first information.

In the foregoing embodiments, the involved distance may be a relative distance or an absolute distance.

It should be noted that, for the information transmission method provided by the embodiments of this application, the execution body may be an information transmission apparatus, or a control module for executing the information transmission method in the information transmission apparatus. In this embodiment of this application, the information transmission method provided by the embodiments of this application is described by using the information transmission method being loaded by the information transmission apparatus as an example.

An embodiment of this application provides an information transmission apparatus, executed by a first communication device 300. As shown in FIG. 5, the apparatus includes: a sending module 310, configured to send second information to at least one second communication device according to at least one of first information or a first rule; where the first information and/or the first rule is used by the first communication device to determine a resource for sending the second information, and the second information is used by the second communication device to perform resource selection, or resource exclusion, or resource reservation, or resource scheduling.

In some embodiments, the first information includes at least one of the following: communication device identification information of a first-information receive end; in-group identification information of the first-information receive end in the user group to which the first-information receive end belongs;

group identification information of a user group to which the first-information receive end belongs;

communication device identification information of a first-information transmit end;

sequence information for sending second information by at least one first communication device;

information included in a case that a third communication device is a starting point of feedback;

time information for sending the second information by the first communication device;

information about the number of communication devices sending second information; or resource information used for transmitting the second information.

In some embodiments, the information included in a case that the third communication device is a starting point of feedback includes at least one of the following:

a communication device identifier of the third communication device;

group identification information corresponding to a group to which the third communication device belongs; or a sending order rule for the second information.

In some embodiments, the time information for sending the second information by the at least first communication device includes at least one of the following:

information about a time interval for sending second information by at least one first communication device;

information about a delay requirement for sending the second information by the at least one first communication device;

information about a time interval between two consecutive transmissions of the second information by the same first communication device;

information about a time interval between any two transmissions of second information by a same first communication device;

information about a delay requirement for two consecutive transmissions of the second information by the same first communication device; or information about a delay requirement for any two transmissions of the second information by the same first communication device.

In some embodiments, the resource information used for transmitting the second information includes at least one of the following:

position information of a time-domain resource for sending second information by at least one first communication device, or delay information for sending the second information by the at least one first communication device; or position information of a frequency-domain resource for sending the second information by the at least one first communication device.

In some embodiments, the position information of the frequency-domain resource for sending the second information by the at least one first communication device includes at least one of the following:

granularity of a frequency-domain resource occupied by at least one piece of second information;

sorting information of the frequency-domain resource occupied for sending the second information by the at least one first communication device; or position information of the frequency-domain resource occupied for sending the second information by the at least one first communication device.

In some embodiments, the first information is carried by at least one of the following: sidelink control information SCI;

PC5-radio resource control RRC message;

RRC message;

media access control control element MAC CE;

downlink control information DCI; or sidelink feedback control information SFCI.

In some embodiments, a transmission resource of the first information uses at least one of the following:

physical sidelink shared channel PSSCH;

physical sidelink control channel PSCCH;

physical sidelink feedback channel PSFCH;

a resource in a dedicated resource pool;

a resource at a first position; or a sidelink Sidelink channel or signal.

In some embodiments, the first rule includes at least one of the following:

determining, based on a distance from the second communication device, a time-domain resource and/or a frequency-domain resource for sending the second information;

determining, based on a measured RSRP value for the second communication device, a time-domain resource and/or a frequency-domain resource for sending the second information;

determining, based on a delay requirement for sending the second information by the first communication device, a time-domain resource for sending the second information;

determining, based on third information predefined in a protocol, a time-domain resource and/or a frequency-domain resource for sending the second information; or determining, according to a second rule, a time-domain resource and/or a frequency-domain resource for sending the second information.

The determining, based on a distance from the second communication device, a time-domain resource and/or a frequency-domain resource for sending the second information includes:

determining, based on at least one of the distance from the second communication device, a first distance reference point, a first time reference point, or a first time step, the time-domain resource and/or a frequency-domain resource for sending the second information.

The determining, based on a measured RSRP value for the second communication device, a time-domain resource for sending the second information includes:

determining, based on at least one of the measured RSRP value for the second communication device, a first power reference point, a first time reference point, or a first time step, the time-domain resource and/or a frequency-domain resource for sending the second information.

The third information includes at least one of the following:

a communication device identifier corresponding to a first communication device that initially transmits second information or identification information of a group to which the first communication device belongs;

a time reference point for sending second information;

a time interval for sending second information by at least two first communication devices;

a chronological order rule for sending second information by at least one first communication device;

a frequency-domain resource occupied for sending second information by one first communication device;

a spacing between frequency-domain resources for sending second information by at least two first communication devices; or a mapping rule or sorting rule in frequency domain for sending second information by at least one first communication device.

The second rule includes at least one of the following:

performing mapping based on a communication device identifier of the first communication device or group identification information of a group to which the first communication device belongs, and determining a time-domain resource for sending the second information;

performing mapping based on the communication device identifier of the first communication device or the group identification information of the group to which the first communication device belongs, and determining a frequency-domain resource for sending the second information;

performing mapping based on a start or end position of a PSFCH feedback frequency-domain resource of the first communication device, and determining a frequency-domain resource for sending the second information;

performing mapping based on a start or end frequency-domain position of a PSCCH of the second communication device, and determining a frequency-domain resource for sending the second information;

performing mapping based on a start or end frequency-domain position of a PSSCH of the second communication device, and determining a frequency-domain resource for sending the second information;

performing mapping based on a distance between the first communication device and the second communication device, and determining a frequency-domain resource for sending the second information;

performing mapping based on an RSRP value of the second communication device measured by the first communication device, and determining a frequency-domain resource for sending the second information; or performing mapping based on an identifier of a zone in which the first communication device is located, and determining a frequency-domain resource for sending the second information.

In some embodiments, the apparatus further includes:

a determining module, configured to determine, based on at least one of the following information, whether to send the second information to the second communication device:

the number of data reception failures;

feedback information or response information;

a received redundancy version RV number;

geographical information of the first communication device and/or the second communication device;

an RSRP value of the second communication device measured by the first communication device;

a group to which the first communication device belongs;

a device identifier of the first communication device;

a monitoring result of the first communication device; or a measurement result of the first communication device.

In some embodiments, the determining, based on the number of data reception failures, whether to send the second information to the second communication device includes at least one of the following:

for data transmitted by a same second communication device, sending the second information to the second communication device after any decoding failure;

for data transmitted by the same second communication device, sending the second information to the second communication device in a case that a cumulative number of reception failures within a target time period exceeds a first threshold;

for data carrying a same group identifier or a same destination identifier, sending the second information to the second communication device after any decoding failure; or for data carrying a same group identifier or a same destination identifier, sending the second information to the second communication device in a case that a cumulative number of reception failures within a target time period exceeds a second threshold.

In some embodiments, the feedback information or response information includes at least one of the following:

the number of feedback timeouts or the number of response timeouts;

the number of feedback failures or the number of response failures;

the number of feedback cancellations or the number of response cancellations; or the number of feedback drops or the number of response drops.

In some embodiments, the determining, based on feedback information or response information, whether to send the second information to the second communication device includes at least one of the following:

in a case that the number of channel state information feedback failures within a target time period exceeds a third threshold, sending the second information to the second communication device;

in a case that the number of channel state information feedback timeouts within a target time period exceeds a fourth threshold, sending the second information to the second communication device;

in a case that the number of feedback timeouts for a communication quality parameter measurement value within a target time period exceeds a fifth threshold, sending the second information to the second communication device;

in a case that the number of feedback failures for a communication quality parameter measurement value within a target time period exceeds a sixth threshold, sending the second information to the second communication device; or in a case that the number of feedback resource sending failures, feedback resource cancelations, or feedback resource drops within a target time period exceeds a seventh threshold, sending the second information to the second communication device.

In some embodiments, the determining, based on the received RV number, whether to send the second information to the second communication device includes at least one of the following:

for a same transport block transmitted from the second communication device, sending the second information to the second communication device in a case that a received RV number of data is a first target value;

for data transmitted by a same second communication device, sending the second information to the second communication device in a case that the number of times of a cumulative number of received RV numbers within a target time period being the first target value exceeds an eighth threshold; or for data carrying a same group identifier or a same destination identifier, sending the second information to the second communication device in a case that the number of times of a cumulative number of received RV numbers within a target time period being the first target value exceeds a ninth threshold.

In some embodiments, the determining, based on the geographical information of the first communication device and/or the second communication device, whether to send the second information to the second communication device, or the determining, based on the RSRP value of the second communication device measured by the first communication device, whether to send the second information to the second communication device includes at least one of the following:

sending the second information to the second communication device in a case that a distance between the first communication device and the second communication device is determined to be greater than, less than, or equal to a tenth threshold;

sending the second information to the second communication device in a case that the RSRP value of the second communication device measured by the first communication device is greater than, less than, or equal to an eleventh threshold;

sending the second information to the second communication device in a case that a zone in which the first communication device is located is the same as a zone in which the second communication device is located, or an zone identifier of the first communication device is the same as an zone identifier of the second communication device;

sending the second information to the second communication device in a case that a result obtained through calculation on the zone identifier of the first communication device and the zone identifier of the second communication device is less than or equal to, greater than or equal to, or equal to a twelfth threshold;

sending the second information to the second communication device in a case that the number of areas in a dimension A between the zone in which the first communication device is located and the zone in which the second communication device is located is less than or equal to, greater than or equal to, or equal to a thirteenth threshold;

sending the second information to the second communication device in a case that the zone identifier of the second communication device is a first target value;

sending the second information to the second communication device in a case that the zone identifier of the first communication device is a second target value; or sending the second information to the second communication device in a case that control information sent by the second communication device and received by the first communication device carries the zone identifier of the second communication device.

In some embodiments, the determining, based on the monitoring result of the first communication device, whether to send the second information to the second communication device includes:

sending the second information to the second communication device in a case that the monitoring result indicates that a resource reserved by the second communication device is at least partially the same as a resource reserved by the first communication device or another communication device, where the another communication device is a communication device other than the first communication device and the second communication device.

In some embodiments, the determining, based on the measurement result of the first communication device, whether to send the second information to the second communication device includes:

sending the second information to the second communication device in a case that a measured value for demodulation reference signal DMRS, channel state information reference signal CSI-RS, or synchronization signal block SSB for data transmission of at least one second communication device is less than or greater than a fourteenth threshold; and sending the second information to the second communication device in a case that the number of times of the measured value for demodulation reference signal DMRS, channel state information reference signal CSI-RS, or synchronization signal block SSB for data transmission of the at least one second communication device being less than or greater than a fifteenth threshold is greater than a sixteenth threshold.

In some embodiments, the method further includes: obtaining the first information or obtaining the first rule.

In some embodiments, a manner of obtaining the first information or obtaining the first rule includes at least one of the following:

obtaining from a notification of the second communication device;

obtaining from a notification of a control node; or obtaining from a notification of a communication device other than the second communication device.

In some embodiments, a time for sending the second information by the first communication device satisfies at least one of the following:

a time interval or delay for sending second information by at least two first communication devices is not less than a first time length;

a time, a time interval, or a delay for sending the second information by the first communication device is not less than a second time length; or a time interval or delay for sending second information at least twice by a same first communication device is not less than a third time length.

In some embodiments, the sending second information to at least one second communication device further includes at least one of the following:

for reception of any data, ending transmission of the second information after correct decoding is implemented;

for reception of any data, ending transmission of the second information after correct decoding is implemented N times, where N is a positive integer;

for reception of any data, ending transmission of the second information in a case that a proportion of correct decoding is greater than a seventeenth threshold;

for data transmitted by at least one second communication device, ending transmission of the second information after correct decoding is implemented;

for data transmitted by at least one second communication device, ending transmission of the second information after correct decoding is implemented M times, where M is a positive integer;

for data transmitted by at least one second communication device, ending transmission of the second information in a case that a proportion of correct decoding is greater than an eighteenth threshold;

for data transmission with a data receive end being a same group identifier, ending transmission of the second information after correct decoding is implemented;

for data transmission with a data receive end being a same group identifier, ending transmission of the second information after correct decoding is implemented H times, where H is a positive integer; or for data transmission with a data receive end being a same group identifier, ending transmission of the second information in a case that a proportion of correct decoding is greater than a nineteenth threshold.

In some embodiments, a length of the target time period is notified by the second communication device or a control node, or is configured by the second communication device or the control node, or is predefined by a protocol.

In some embodiments, a length of the target time period is associated with at least one of the following:

a subcarrier spacing of a bandwidth part;

a parameter associated with quality of service of a service of the second communication device; or a service delay.

The information transmission apparatus in this embodiment of this application may be an apparatus, or may be a component, an integrated circuit, or a chip in a communication device. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network-attached storage (NAS), a personal computer (PC), a television (TV), a teller machine, a self-service machine, or the like. This is not specifically limited in the embodiments of this application.

The information transmission apparatus in this embodiment of this application may be an apparatus with an operating system. The operating system may be an Android operating system, an iOS operating system, or other possible operating systems, and is not specifically limited in the embodiments of this application.

It should be noted that, for the resource selection method provided in the embodiments of this application, the execution body may be a resource selection apparatus, or a control module for executing the resource selection method in the resource selection apparatus. In this embodiment of this application, the resource selection method provided by the embodiments of this application is described by using the resource selection method being executed by the resource selection apparatus as an example.

Figure 6:
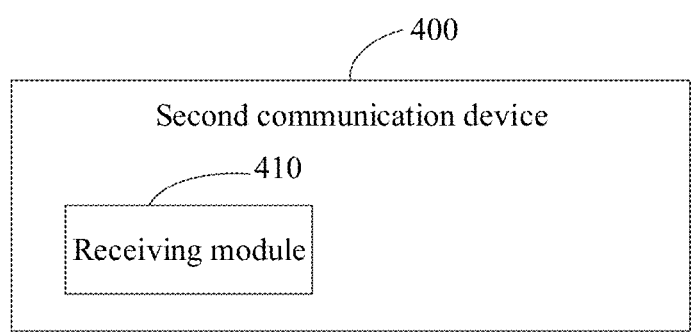
FIG. 6 is a schematic structural diagram of a resource selection apparatus according to an embodiment of this application.

An embodiment of this application provides a resource selection apparatus, executed by a second communication device 400. As shown in FIG. 6, the apparatus includes:

a receiving module 410, configured to receive second information from a first communication device; where the second information is used by the second communication device to perform resource selection, or resource exclusion, or resource reservation, or resource scheduling.

In some embodiments, the receiving module 410 is specifically configured to perform at least one of the following steps:

selecting all resources of a first resource set for resource reservation, or resource exclusion, or resource scheduling, or resource selection; or randomly selecting N1 resources of the first resource set for resource reservation, or resource exclusion, or resource scheduling, or resource selection; where N1 is a positive integer.

In some embodiments, a manner of determining the first resource set includes at least one of the following:

determining based on a union of resources indicated by fourth information;

determining based on an intersection of the resources indicated by the fourth information;

determining based on most frequently occurring resources in the resources indicated by the fourth information;

determining based on top N2 most frequently occurring resources in the resources indicated by the fourth information, where N2 is a positive integer; or determining based on top N3% most frequently occurring resources in the resources indicated by the fourth information, where N3 is a positive integer.

In some embodiments, the fourth information includes at least one of the following:

all second information received by the second communication device; or part of second information received by the second communication device.

The resource selection apparatus in this embodiment of this application may be an apparatus, or may be a component, an integrated circuit, or a chip in a communication device. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network-attached storage (NAS), a personal computer (PC), a television (TV), a teller machine, a self-service machine, or the like. This is not specifically limited in the embodiments of this application.

The resource selection apparatus in this embodiment of this application may be an apparatus with an operating system. The operating system may be an Android operating system, an iOS operating system, or other possible operating systems, and is not specifically limited in the embodiments of this application.

Optionally, an embodiment of this application further provides an electronic device, including a processor, a memory, and a program or instructions stored in the memory and capable of running on the processor. When the program or the instructions are executed by the processor, the processes of the foregoing embodiment of the information transmission method or the resource selection method are implemented, with the same technical effects achieved. To avoid repetition, details are not described herein again.

It should be noted that the electronic device in this embodiment of this application includes the aforementioned mobile electronic device and non-mobile electronic device.

Figure 7:
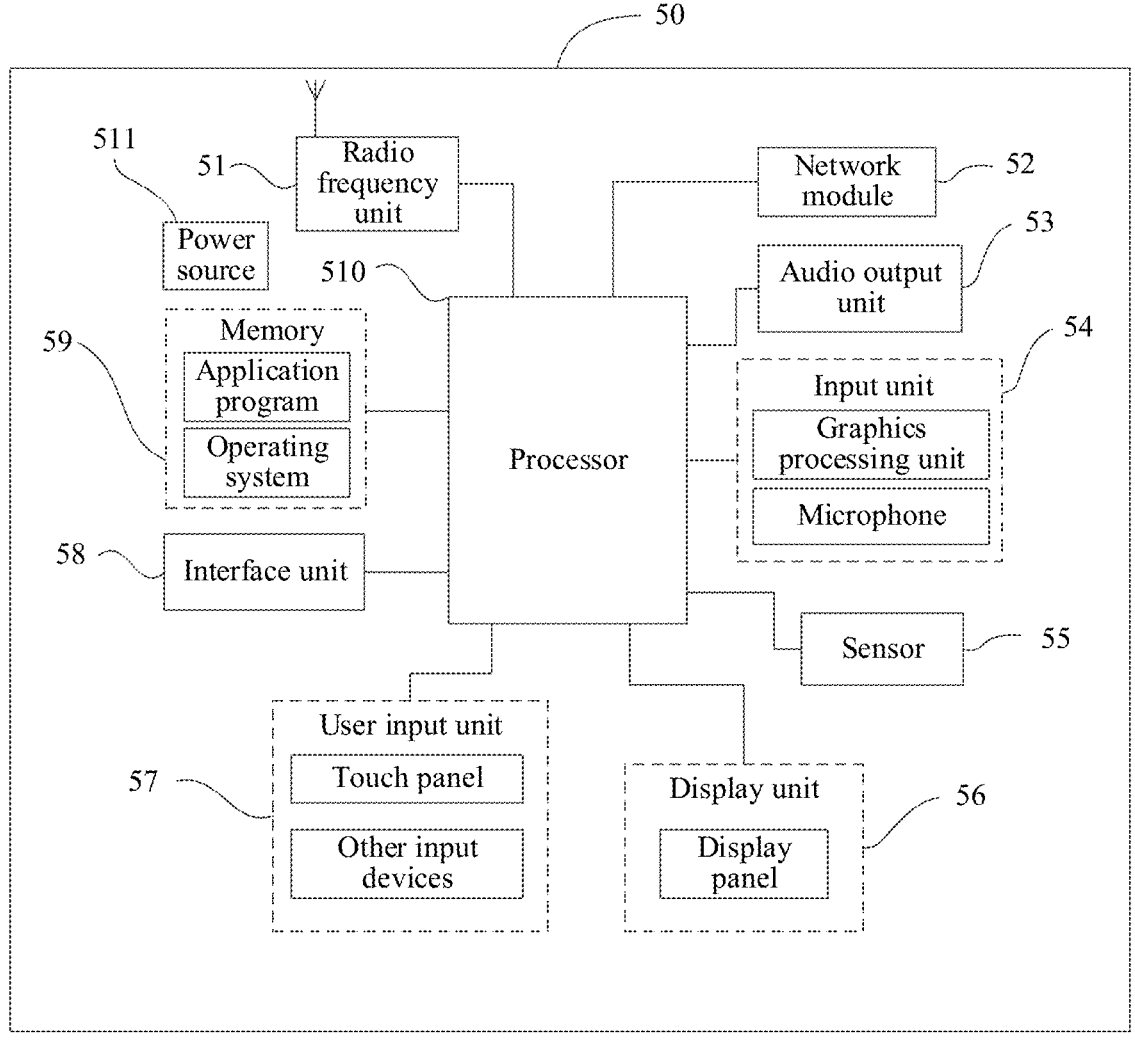
FIG. 7 is a schematic compositional diagram of a terminal according to an embodiment of this application.

The electronic device in this embodiment may be a terminal. FIG. 7 is a schematic structural diagram of hardware of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Persons skilled in the art may understand that the structure of the terminal shown in FIG. 7 does not constitute any limitation on the terminal. The terminal may include more or fewer components than shown in the figure, or a combination of some components, or the components disposed differently. In this embodiment of this application, the terminal includes but is not limited to a mobile phone, a tablet computer, a laptop computer, a personal digital assistant, an in-vehicle terminal, a wearable device, and a pedometer.

It should be understood that in this embodiment of this application, the radio frequency unit 51 may be configured to receive and send information, or to receive and send a signal in a call process, and specially, after receiving downlink data from a base station, send the downlink data to the processor 510 for processing; and also send uplink data to the base station. Generally, the radio frequency unit 51 includes but is not limited to an antenna, at least one amplifier, a transceiver, a coupler, a low noise amplifier, and a duplexer. In addition, the radio frequency unit 51 may also communicate with a network and other devices via a wireless communications system.

The memory 59 may be configured to store software programs and various data. The memory 59 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 59 may include a high-speed random access memory, and may further include a non-volatile memory such as a disk storage device, a flash memory device, or another volatile solid-state storage device.

The processor 510 is a control center of the terminal, and is connected to all components of the terminal by using various interfaces and lines. By running or executing a software program and/or module that is stored in the memory 59 and calling data stored in the memory 59, the processor 510 executes various functions of the terminal and processes data, so as to perform overall monitoring on the terminal. The processor 510 may include one or at least two processing units. Preferably, the processor 510 may integrate an application processor and a modem processor. The application processor mainly processes the operating system, a user interface, an application program, and the like. The modem processor mainly processes wireless communication. It can be understood that the modem processor may alternatively be not integrated in the processor 510.

The terminal 50 may further include the power supply 511 (such as a battery) supplying power to each component. Preferably, the power supply 511 may be logically connected to the processor 510 by using a power management system, so that functions such as charge and discharge management and power consumption management are implemented by using the power management system.

In addition, the terminal 50 includes some functional modules that are not illustrated. Details are not described herein.

When the terminal is used to execute the foregoing information transmission method, the processor 510 is configured to send second information to at least one second communication device according to at least one of first information or a first rule.

The first information and/or the first rule is used by the first communication device to determine a resource for sending the second information, and the second information is used by the second communication device to perform resource selection, or resource exclusion, or resource reservation, or resource scheduling.

In some embodiments, the first information includes at least one of the following: communication device identification information of a first-information receive end; in-group identification information of the first-information receive end in the user group to which the first-information receive end belongs;

group identification information of a user group to which the first-information receive end belongs;

communication device identification information of a first-information transmit end;

sequence information for sending second information by at least one first communication device;

information included in a case that a third communication device is a starting point of feedback;

time information for sending the second information by the first communication device;

information about the number of communication devices sending second information; or resource information used for transmitting the second information.

In some embodiments, the information included in a case that the third communication device is a starting point of feedback includes at least one of the following: a communication device identifier of the third communication device;

group identification information corresponding to a group to which the third communication device belongs; or a sending order rule for the second information.

In some embodiments, the time information for sending the second information by the at least first communication device includes at least one of the following:

information about a time interval for sending second information by at least one first communication device;

information about a delay requirement for sending the second information by the at least one first communication device;

information about a time interval between two consecutive transmissions of the second information by the same first communication device;

information about a time interval between any two transmissions of second information by a same first communication device;

information about a delay requirement for two consecutive transmissions of the second information by the same first communication device; or information about a delay requirement for any two transmissions of the second information by the same first communication device.

In some embodiments, the resource information used for transmitting the second information includes at least one of the following:

position information of a time-domain resource for sending second information by at least one first communication device, or delay information for sending the second information by the at least one first communication device; or position information of a frequency-domain resource for sending the second information by the at least one first communication device.

In some embodiments, the position information of the frequency-domain resource for sending the second information by the at least one first communication device includes at least one of the following:

granularity of a frequency-domain resource occupied by at least one piece of second information;

sorting information of the frequency-domain resource occupied for sending the second information by the at least one first communication device; or position information of the frequency-domain resource occupied for sending the second information by the at least one first communication device.

In some embodiments, the first information is carried by at least one of the following:

sidelink control information SCI;

PC5-radio resource control RRC message;

RRC message;

media access control control element MAC CE;

downlink control information DCI; or sidelink feedback control information SFCI.

In some embodiments, a transmission resource of the first information uses at least one of the following:

physical sidelink shared channel PSSCH;

physical sidelink control channel PSCCH;

physical sidelink feedback channel PSFCH;

a resource in a dedicated resource pool;

a resource at a first position; or a sidelink Sidelink channel or signal.

In some embodiments, the first rule includes at least one of the following:

determining, based on a distance from the second communication device, a time-domain resource and/or a frequency-domain resource for sending the second information;

determining, based on a measured RSRP value for the second communication device, a time-domain resource and/or a frequency-domain resource for sending the second information;

determining, based on a delay requirement for sending the second information by the first communication device, a time-domain resource for sending the second information;

determining, based on third information predefined in a protocol, a time-domain resource and/or a frequency-domain resource for sending the second information; or determining, according to a second rule, a time-domain resource and/or a frequency-domain resource for sending the second information.

The determining, based on a distance from the second communication device, a time-domain resource and/or a frequency-domain resource for sending the second information includes:

determining, based on at least one of the distance from the second communication device, a first distance reference point, a first time reference point, or a first time step, the time-domain resource and/or a frequency-domain resource for sending the second information.

The determining, based on a measured RSRP value for the second communication device, a time-domain resource for sending the second information includes:

determining, based on at least one of the measured RSRP value for the second communication device, a first power reference point, a first time reference point, or a first time step, the time-domain resource and/or a frequency-domain resource for sending the second information.

The third information includes at least one of the following:

a communication device identifier corresponding to a first communication device that initially transmits second information or identification information of a group to which the first communication device belongs;

a time reference point for sending second information;

a time interval for sending second information by at least two first communication devices;

a chronological order rule for sending second information by at least one first communication device;

a frequency-domain resource occupied for sending second information by one first communication device;

a spacing between frequency-domain resources for sending second information by at least two first communication devices; or a mapping rule or sorting rule in frequency domain for sending second information by at least one first communication device.

The second rule includes at least one of the following:

performing mapping based on a communication device identifier of the first communication device or group identification information of a group to which the first communication device belongs, and determining a time-domain resource for sending the second information;

performing mapping based on the communication device identifier of the first communication device or the group identification information of the group to which the first communication device belongs, and determining a frequency-domain resource for sending the second information;

performing mapping based on a start or end position of a PSFCH feedback frequency-domain resource of the first communication device, and determining a frequency-domain resource for sending the second information;

performing mapping based on a start or end frequency-domain position of a PSCCH of the second communication device, and determining a frequency-domain resource for sending the second information;

performing mapping based on a start or end frequency-domain position of a PSSCH of the second communication device, and determining a frequency-domain resource for sending the second information;

performing mapping based on a distance between the first communication device and the second communication device, and determining a frequency-domain resource for sending the second information;

performing mapping based on an RSRP value of the second communication device measured by the first communication device, and determining a frequency-domain resource for sending the second information; or performing mapping based on an identifier of a zone in which the first communication device is located, and determining a frequency-domain resource for sending the second information.

In some embodiments, the processor 510 is further configured to determine, based on at least one of the following information, whether to send the second information to the second communication device:

the number of data reception failures;

feedback information or response information;

a received redundancy version RV number;

geographical information of the first communication device and/or the second communication device;

an RSRP value of the second communication device measured by the first communication device;

a group to which the first communication device belongs;

a device identifier of the first communication device;

a monitoring result of the first communication device; or a measurement result of the first communication device.

In some embodiments, the determining, based on the number of data reception failures, whether to send the second information to the second communication device includes at least one of the following:

for data transmitted by a same second communication device, sending the second information to the second communication device after any decoding failure;

for data transmitted by the same second communication device, sending the second information to the second communication device in a case that a cumulative number of reception failures within a target time period exceeds a first threshold;

for data carrying a same group identifier or a same destination identifier, sending the second information to the second communication device after any decoding failure; or for data carrying a same group identifier or a same destination identifier, sending the second information to the second communication device in a case that a cumulative number of reception failures within a target time period exceeds a second threshold.

In some embodiments, the feedback information or response information includes at least one of the following:

the number of feedback timeouts or the number of response timeouts;

the number of feedback failures or the number of response failures;

the number of feedback cancellations or the number of response cancellations; or the number of feedback drops or the number of response drops.

In some embodiments, the determining, based on the feedback information or response information, whether to send the second information to the second communication device includes at least one of the following:

in a case that the number of channel state information feedback failures within a target time period exceeds a third threshold, sending the second information to the second communication device;

in a case that the number of channel state information feedback timeouts within a target time period exceeds a fourth threshold, sending the second information to the second communication device;

in a case that the number of feedback timeouts for a communication quality parameter measurement value within a target time period exceeds a fifth threshold, sending the second information to the second communication device;

in a case that the number of feedback failures for a communication quality parameter measurement value within a target time period exceeds a sixth threshold, sending the second information to the second communication device; or in a case that the number of feedback resource sending failures, feedback resource cancelations, or feedback resource drops within a target time period exceeds a seventh threshold, sending the second information to the second communication device.

In some embodiments, the determining, based on the received RV number, whether to send the second information to the second communication device includes at least one of the following:

for a same transport block transmitted from the second communication device, sending the second information to the second communication device in a case that a received RV number of data is a first target value;

for data transmitted by a same second communication device, sending the second information to the second communication device in a case that the number of times of a cumulative number of received RV numbers within a target time period being the first target value exceeds an eighth threshold; or for data carrying a same group identifier or a same destination identifier, sending the second information to the second communication device in a case that the number of times of a cumulative number of received RV numbers within a target time period being the first target value exceeds a ninth threshold.

In some embodiments, the determining, based on the geographical information of the first communication device and/or the second communication device, whether to send the second information to the second communication device, or the determining, based on the RSRP value of the second communication device measured by the first communication device, whether to send the second information to the second communication device includes at least one of the following:

sending the second information to the second communication device in a case that a distance between the first communication device and the second communication device is determined to be greater than, less than, or equal to a tenth threshold;

sending the second information to the second communication device in a case that the RSRP value of the second communication device measured by the first communication device is greater than, less than, or equal to an eleventh threshold;

sending the second information to the second communication device in a case that a zone in which the first communication device is located is the same as a zone in which the second communication device is located, or an zone identifier of the first communication device is the same as an zone identifier of the second communication device;

sending the second information to the second communication device in a case that a result obtained through calculation on the zone identifier of the first communication device and the zone identifier of the second communication device is less than or equal to, greater than or equal to, or equal to a twelfth threshold;

sending the second information to the second communication device in a case that the number of areas in a dimension A between the zone in which the first communication device is located and the zone in which the second communication device is located is less than or equal to, greater than or equal to, or equal to a thirteenth threshold;

sending the second information to the second communication device in a case that the zone identifier of the second communication device is a first target value;

sending the second information to the second communication device in a case that the zone identifier of the first communication device is a second target value; or sending the second information to the second communication device in a case that control information sent by the second communication device and received by the first communication device carries the zone identifier of the second communication device.

In some embodiments, the determining, based on the monitoring result of the first communication device, whether to send the second information to the second communication device includes:

sending the second information to the second communication device in a case that the monitoring result indicates that a resource reserved by the second communication device is at least partially the same as a resource reserved by the first communication device or another communication device, where the another communication device is a communication device other than the first communication device and the second communication device.

In some embodiments, the determining, based on the measurement result of the first communication device, whether to send the second information to the second communication device includes:

sending the second information to the second communication device in a case that a measured value for demodulation reference signal DMRS, channel state information reference signal CSI-RS, or synchronization signal block SSB for data transmission of at least one second communication device is less than or greater than a fourteenth threshold; and sending the second information to the second communication device in a case that the number of times of the measured value for demodulation reference signal DMRS, channel state information reference signal CSI-RS, or synchronization signal block SSB for data transmission of the at least one second communication device being less than or greater than a fifteenth threshold is greater than a sixteenth threshold.

In some embodiments, the method further includes: obtaining the first information or obtaining the first rule.

In some embodiments, a manner of obtaining the first information or obtaining the first rule includes at least one of the following:

obtaining from a notification of the second communication device;

obtaining from a notification of a control node; or obtaining from a notification of a communication device other than the second communication device.

In some embodiments, a time for sending the second information by the first communication device satisfies at least one of the following:

a time interval or delay for sending second information by at least two first communication devices is not less than a first time length;

a time, a time interval, or a delay for sending the second information by the first communication device is not less than a second time length; or a time interval or delay for sending second information at least twice by a same first communication device is not less than a third time length.

In some embodiments, the sending second information to at least one second communication device further includes at least one of the following:

for reception of any data, ending transmission of the second information after correct decoding is implemented;

for reception of any data, ending transmission of the second information after correct decoding is implemented N times, where N is a positive integer;

for reception of any data, ending transmission of the second information in a case that a proportion of correct decoding is greater than a seventeenth threshold;

for data transmitted by at least one second communication device, ending transmission of the second information after correct decoding is implemented;

for data transmitted by at least one second communication device, ending transmission of the second information after correct decoding is implemented M times, where M is a positive integer;

for data transmitted by at least one second communication device, ending transmission of the second information in a case that a proportion of correct decoding is greater than an eighteenth threshold;

for data transmission with a data receive end being a same group identifier, ending transmission of the second information after correct decoding is implemented;

for data transmission with a data receive end being a same group identifier, ending transmission of the second information after correct decoding is implemented H times, where H is a positive integer; or for data transmission with a data receive end being a same group identifier, ending transmission of the second information in a case that a proportion of correct decoding is greater than a nineteenth threshold.

In some embodiments, a length of the target time period is notified by the second communication device or a control node, or is configured by the second communication device or the control node, or is predefined by a protocol.

In some embodiments, a length of the target time period is associated with at least one of the following:

a subcarrier spacing of a bandwidth part;

a parameter associated with quality of service of a service of the second communication device; or a service delay.

When the terminal executes the foregoing resource selection method, the processor 510 is configured to receive the second information from the first communication device.

The second information is used by the second communication device to perform resource selection, or resource exclusion, or resource reservation, or resource scheduling.

In some embodiments, the processor 510 is specifically configured to perform at least one of the following steps:

selecting all resources of a first resource set for resource reservation, or resource exclusion, or resource scheduling, or resource selection; or randomly selecting N1 resources of the first resource set for resource reservation, or resource exclusion, or resource scheduling, or resource selection; where N1 is a positive integer.

In some embodiments, a manner of determining the first resource set includes at least one of the following:

determining based on a union of resources indicated by fourth information;

determining based on an intersection of the resources indicated by the fourth information;

determining based on most frequently occurring resources in the resources indicated by the fourth information;

determining based on top N2 most frequently occurring resources in the resources indicated by the fourth information, where N2 is a positive integer; or determining based on top N3% most frequently occurring resources in the resources indicated by the fourth information, where N3 is a positive integer.

In some embodiments, the fourth information includes at least one of the following: all second information received by the second communication device; or part of second information received by the second communication device.

An embodiment of this application further provides a readable storage medium, where a program or instructions are stored in the readable storage medium. When the program or instructions are executed by a processor, the processes of the foregoing embodiments of the information transmission method or the resource selection method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the information transmission method or the resource selection method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a communication device (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information transmission method, executed by a first communication device and comprising:

sending second information to at least one second communication device according to at least one of first information or a first rule; wherein the first information and/or the first rule is used by the first communication device to determine a resource for sending the second information, and the second information is used by the second communication device to perform resource selection, or resource exclusion, or resource reservation, or resource scheduling;

wherein before the sending second information to at least one second communication device, the method further comprises:

determining, by the first communication device based on at least one of the following information, whether to send the second information to the second communication device:

feedback information or response information;

a received redundancy version RV number;

geographical information of the first communication device and/or the second communication device;

an RSRP value of the second communication device measured by the first communication device;

a group to which the first communication device belongs; or a device identifier of the first communication device;

wherein the first information comprises information comprised in a case that a third communication device is a starting point of feedback;

the information comprised in a case that the third communication device is a starting point of feedback comprises at least one of the following:

a communication device identifier of the third communication device;

group identification information corresponding to a group to which the third communication device belongs; or a sending order rule for the second information.

2. The information transmission method according to claim 1, wherein the first information further comprises at least one of the following:

communication device identification information of a first-information transmit end;

communication device identification information of a first-information receive end;

group identification information of a user group to which the first-information receive end belongs;

in-group identification information of the first-information receive end in the user group to which the first-information receive end belongs;

sequence information for sending second information by at least one first communication device;

time information for sending the second information by the first communication device;

information about the number of communication devices sending second information; or resource information used for transmitting the second information.

3. The information transmission method according to claim 2, wherein the time information for sending the second information by the at least one first communication device comprises at least one of the following:

information about a time interval for sending second information by at least one first communication device;

information about a delay requirement for sending the second information by the at least one first communication device;

information about a time interval between any two transmissions of second information by a same first communication device;

information about a time interval between two consecutive transmissions of the second information by the same first communication device;

information about a delay requirement for two consecutive transmissions of the second information by the same first communication device; or information about a delay requirement for any two transmissions of the second information by the same first communication device.

4. The information transmission method according to claim 2, wherein the resource information used for transmitting the second information comprises at least one of the following:

position information of a time-domain resource for sending second information by at least one first communication device, or delay information for sending the second information by the at least one first communication device; or position information of a frequency-domain resource for sending the second information by the at least one first communication device.

5. The information transmission method according to claim 4, wherein the position information of the frequency-domain resource for sending the second information by the at least one first communication device comprises at least one of the following:

granularity of a frequency-domain resource occupied by at least one piece of second information;

sorting information of the frequency-domain resource occupied for sending the second information by the at least one first communication device; or position information of the frequency-domain resource occupied for sending the second information by the at least one first communication device.

6. The information transmission method according to claim 1, wherein the first information is carried by at least one of the following:

sidelink control information (SCI);

PC5-radio resource control (RRC) message;

RRC message;

media access control control element (MAC CE);

downlink control information (DCI); or sidelink feedback control information (SFCI).

7. The information transmission method according to claim 1, wherein a transmission resource of the first information uses at least one of the following:

physical sidelink shared channel (PSSCH);

physical sidelink control channel (PSCCH);

physical sidelink feedback channel (PSFCH);

a resource in a dedicated resource pool;

a resource at a first position; or a sidelink channel or signal.

8. The information transmission method according to claim 1, wherein the first rule comprises at least one of the following:

determining, based on a distance from the second communication device, a time-domain resource and/or a frequency-domain resource for sending the second information;

determining, based on a measured RSRP value for the second communication device, a time-domain resource and/or a frequency-domain resource for sending the second information;

determining, based on a delay requirement for sending the second information by the first communication device, a time-domain resource for sending the second information;

determining, based on third information predefined in a protocol, a time-domain resource and/or a frequency-domain resource for sending the second information; or determining, according to a second rule, a time-domain resource and/or a frequency-domain resource for sending the second information.

9. The information transmission method according to claim 8, wherein the determining, based on a distance from the second communication device, a time-domain resource and/or a frequency-domain resource for sending the second information comprises:

determining, based on at least one of the distance from the second communication device, a first distance reference point, a first time reference point, or a first time step, the time-domain resource and/or a frequency-domain resource for sending the second information; or, wherein the determining, based on a measured RSRP value for the second communication device, a time-domain resource and/or a frequency-domain resource for sending the second information comprises:

determining, based on at least one of the measured RSRP value for the second communication device, a first power reference point, a first time reference point, or a first time step, the time-domain resource and/or a frequency-domain resource for sending the second information; or, wherein the third information comprises at least one of the following:

a communication device identifier corresponding to a first communication device that initially transmits second information or identification information of a group to which the first communication device belongs;

a time reference point for sending second information;

a time interval for sending second information by at least two first communication devices;

a chronological order rule for sending second information by at least one first communication device;

a frequency-domain resource occupied for sending second information by one first communication device;

a spacing between frequency-domain resources for sending second information by at least two first communication devices; or a mapping rule or sorting rule in frequency domain for sending second information by at least one first communication device; or, wherein the second rule comprises at least one of the following:

performing mapping based on a communication device identifier of the first communication device or group identification information of a group to which the first communication device belongs, and determining a time-domain resource for sending the second information;

performing mapping based on the communication device identifier of the first communication device or the group identification information of the group to which the first communication device belongs, and determining a frequency-domain resource for sending the second information;

performing mapping based on a start or end position of a PSFCH feedback frequency-domain resource of the first communication device, and determining a frequency-domain resource for sending the second information;

performing mapping based on a start or end frequency-domain position of a PSCCH of the second communication device, and determining a frequency-domain resource for sending the second information;

performing mapping based on a start or end frequency-domain position of a PSSCH of the second communication device, and determining a frequency-domain resource for sending the second information;

performing mapping based on a distance between the first communication device and the second communication device, and determining a frequency-domain resource for sending the second information;

performing mapping based on an RSRP value of the second communication device measured by the first communication device, and determining a frequency-domain resource for sending the second information; or performing mapping based on an identifier of a zone in which the first communication device is located, and determining a frequency-domain resource for sending the second information.

10. A resource selection method, executed by a second communication device and comprising:

receiving second information from a first communication device; wherein the second information is used by the second communication device to perform resource selection, or resource exclusion, or resource reservation, or resource scheduling;

wherein the second information is determined by the first communication device whether to send to the second communication device based on at least one of the following information:

feedback information or response information;

a received redundancy version RV number;

geographical information of the first communication device and/or the second communication device;

an RSRP value of the second communication device measured by the first communication device;

a group to which the first communication device belongs; or a device identifier of the first communication device;

wherein a resource for sending the second information is determined based on first information and/or a first rule; the first information comprises information comprised in a case that a third communication device is a starting point of feedback;

the information comprised in a case that the third communication device is a starting point of feedback comprises at least one of the following:

a communication device identifier of the third communication device;

group identification information corresponding to a group to which the third communication device belongs; or a sending order rule for the second information.

11. The resource selection method according to claim 10, wherein that the second communication device performs resource selection, or resource exclusion, or resource reservation, or resource scheduling based on the second information comprises at least one of the following:

selecting all resources of a first resource set for resource reservation, or resource exclusion, or resource scheduling, or resource selection; or randomly selecting N1 resources of the first resource set for resource reservation, or resource exclusion, or resource scheduling, or resource selection; wherein N1 is a positive integer.

12. The resource selection method according to claim 11, wherein a manner of determining the first resource set comprises at least one of the following:

determining based on a union of resources indicated by fourth information;

determining based on an intersection of the resources indicated by the fourth information;

determining based on most frequently occurring resources in the resources indicated by the fourth information;

determining based on top N2 most frequently occurring resources in the resources indicated by the fourth information, wherein N2 is a positive integer; or determining based on top N3% most frequently occurring resources in the resources indicated by the fourth information, wherein N3 is a positive integer.

13. The resource selection method according to claim 12, wherein the fourth information comprises at least one of the following:

all second information received by the second communication device; or part of second information received by the second communication device.

14. An electronic device, comprising a processor, a memory, and a program or instructions stored in the memory and capable of running on the processor, wherein when the program or the instructions are executed by the processor, the steps of the method according to claim 1 are implemented.

15. A second communication device, comprising a processor, a memory, and a program or instructions stored in the memory and capable of running on the processor, wherein when the program or the instructions are executed by the processor, the steps of a resource selection method are implemented, wherein the steps of the resource selection method comprises:

receiving second information from a first communication device; wherein the second information is used by the second communication device to perform resource selection, or resource exclusion, or resource reservation, or resource scheduling;

wherein the second information is determined by the first communication device whether to send to the second communication device based on at least one of the following information:

feedback information or response information;

a received redundancy version RV number;

geographical information of the first communication device and/or the second communication device;

an RSRP value of the second communication device measured by the first communication device;

a group to which the first communication device belongs; or a device identifier of the first communication device;

wherein a resource for sending the second information is determined based on first information and/or a first rule; the first information comprises information comprised in a case that a third communication device is a starting point of feedback;

the information comprised in a case that the third communication device is a starting point of feedback comprises at least one of the following:

a communication device identifier of the third communication device;

group identification information corresponding to a group to which the third communication device belongs; or a sending order rule for the second information.

16. The second communication device according to claim 15, wherein that the second communication device performs resource selection, or resource exclusion, or resource reservation, or resource scheduling based on the second information comprises at least one of the following:

selecting all resources of a first resource set for resource reservation, or resource exclusion, or resource scheduling, or resource selection; or randomly selecting N1 resources of the first resource set for resource reservation, or resource exclusion, or resource scheduling, or resource selection; wherein N1 is a positive integer.

17. The second communication device according to claim 16, wherein a manner of determining the first resource set comprises at least one of the following:

determining based on a union of resources indicated by fourth information;

determining based on an intersection of the resources indicated by the fourth information;

determining based on most frequently occurring resources in the resources indicated by the fourth information;

determining based on top N2 most frequently occurring resources in the resources indicated by the fourth information, wherein N2 is a positive integer; or determining based on top N3% most frequently occurring resources in the resources indicated by the fourth information, wherein N3 is a positive integer.

18. The second communication device according to claim 17, wherein the fourth information comprises at least one of the following:

all second information received by the second communication device; or part of second information received by the second communication device.

* * * * *